United States Patent
Fukuyama et al.

(10) Patent No.: US 11,201,527 B2
(45) Date of Patent: Dec. 14, 2021

(54) DEVICE, METHOD, AND JIG FOR MANUFACTURING MAGNET EMBEDDED CORE

(71) Applicant: Kuroda Precision Industries Ltd., Kanagawa (JP)

(72) Inventors: Osamu Fukuyama, Hadano (JP); Tomoaki Murayama, Nagano (JP); Tetsuya Nishizawa, Chikuma (JP); Masanobu Ikeda, Chikuma (JP); Kazuo Nakamura, Chikuma (JP)

(73) Assignee: KURODA PRECISION INDUSTRIES LTD., Kanagawa (JP)

( * ) Notice: Subject to any disclaimer, the term of this patent is extended or adjusted under 35 U.S.C. 154(b) by 465 days.

(21) Appl. No.: 16/092,294

(22) PCT Filed: Apr. 10, 2017

(86) PCT No.: PCT/JP2017/014700
§ 371 (c)(1),
(2) Date: Oct. 9, 2018

(87) PCT Pub. No.: WO2017/179547
PCT Pub. Date: Oct. 19, 2017

(65) Prior Publication Data
US 2020/0099278 A1 Mar. 26, 2020

(30) Foreign Application Priority Data

Apr. 13, 2016 (WO) .................. PCT/JP2016/002009
Sep. 9, 2016 (WO) .................. PCT/JP2016/004123
(Continued)

(51) Int. Cl.
*H02K 15/12* (2006.01)
*H02K 15/03* (2006.01)
(Continued)

(52) U.S. Cl.
CPC .......... *H02K 15/125* (2013.01); *B29C 43/18* (2013.01); *B29C 45/03* (2013.01);
(Continued)

(58) Field of Classification Search
CPC .......... H02K 15/03; H02K 1/276; H02K 1/28; H02K 15/12; B29C 45/03;
(Continued)

(56) References Cited

U.S. PATENT DOCUMENTS 3,488,410 A   1/1970   Downes
3,568,554 A   3/1971   Wiechee
(Continued)

FOREIGN PATENT DOCUMENTS

CN   101356711 A   1/2009
CN   102843000 A   12/2012
(Continued)

OTHER PUBLICATIONS

International Search Report for PCT/JP2016/002009 dated Jul. 7, 2016, 2 pages.
(Continued)

*Primary Examiner* — Peter Dungba Vo
*Assistant Examiner* — Jose K Abraham
(74) *Attorney, Agent, or Firm* — Dority & Manning, P.A.

(57) ABSTRACT

To prevent creation of unnecessary resin when fixing a magnet with resin, a manufacturing method for manufacturing a magnet embedded core comprises: a placing step of placing the rotor core on a mounting table such that an end surface of the rotor core is in contact with the mounting table; a resin charging step of charging the resin in solid state into the magnet insertion hole; a melting step of inciting the resin in the magnet insertion hole; a magnet inserting step of inserting the magnet into the magnet insertion hole; a closure step of closing the opening of the magnet insertion
(Continued)

hole remote from the mounting table; and a resin pressurizing step of pressurizing the molten resin that has flowed into a buffer chamber formed in the mounting table from the opening of the magnet insertion hole on a side of the mounting table following the closure step.

18 Claims, 18 Drawing Sheets

(30) Foreign Application Priority Data

Oct. 31, 2016 (WO) .................. PCT/JP2016/082291
Mar. 24, 2017 (WO) .................. PCT/JP2017/012034

(51) Int. Cl.
| | |
|---|---|
| H02K 1/27 | (2006.01) |
| H02K 1/28 | (2006.01) |
| B29C 43/18 | (2006.01) |
| H02K 11/20 | (2016.01) |
| H02K 11/21 | (2016.01) |
| H02K 11/30 | (2016.01) |
| B29C 45/03 | (2006.01) |
| B29C 45/14 | (2006.01) |
| B29C 45/76 | (2006.01) |
| B29C 45/80 | (2006.01) |
| F16H 25/20 | (2006.01) |
| H02K 7/06 | (2006.01) |
| B29K 101/10 | (2006.01) |
| B29K 105/00 | (2006.01) |
| B29L 31/00 | (2006.01) |

(52) U.S. Cl.
CPC .... *B29C 45/14467* (2013.01); *B29C 45/7653* (2013.01); *B29C 45/80* (2013.01); *F16H 25/20* (2013.01); *H02K 1/276* (2013.01); *H02K 1/28* (2013.01); *H02K 7/06* (2013.01); *H02K 11/20* (2016.01); *H02K 11/21* (2016.01); *H02K 11/30* (2016.01); *H02K 15/03* (2013.01); *H02K 15/12* (2013.01); *B29C 2043/182* (2013.01); *B29C 2945/76006* (2013.01); *B29C 2945/76083* (2013.01); *B29C 2945/76568* (2013.01); *B29K 2101/10* (2013.01); *B29K 2105/251* (2013.01); *B29K 2995/0008* (2013.01); *B29L 2031/7498* (2013.01); *F16H 2025/2053* (2013.01)

(58) Field of Classification Search
CPC .... B29C 2945/76006; B29C 2043/182; B29K 2101/10; B29K 2995/0008
See application file for complete search history.

(56) References Cited

U.S. PATENT DOCUMENTS

| | | | |
|---|---|---|---|
| 4,923,383 | A | 5/1990 | Kurumaji |
| 8,896,177 | B2 | 11/2014 | Kim |
| 8,991,035 | B2 | 3/2015 | Sasaki et al. |
| 2009/0085416 | A1 | 4/2009 | Masuzawa et al. |
| 2009/0189309 | A1* | 7/2009 | Matsubayashi ... B29C 45/14065 264/263 |
| 2010/0083486 | A1 | 4/2010 | Amano et al. |
| 2013/0069747 | A1 | 3/2013 | Honkura et al. |
| 2014/0042856 | A1 | 2/2014 | Miyashita et al. |
| 2014/0124978 | A1* | 5/2014 | Mabu ..................... H02K 15/03 264/261 |
| 2014/0131919 | A1* | 5/2014 | Mabu ..................... H02K 15/03 264/263 |
| 2014/0196276 | A1 | 7/2014 | Nagai et al. |
| 2014/0327329 | A1* | 11/2014 | Kitada ................... H02K 15/03 310/43 |
| 2015/0054196 | A1 | 2/2015 | Ishimatsu et al. |
| 2016/0134179 | A1* | 5/2016 | Nagai .................... H02K 15/12 29/598 |

FOREIGN PATENT DOCUMENTS

| | | |
|---|---|---|
| DE | 102011078419 | 6/2012 |
| DE | 102011119512 | 5/2013 |
| JP | 2001169485 | 6/2001 |
| JP | 2001352747 | 12/2001 |
| JP | 2002272033 | 9/2002 |
| JP | 2005185081 | 7/2005 |
| JP | 2006211748 | 8/2006 |
| JP | 2006311782 | 11/2006 |
| JP | 2007110880 | 4/2007 |
| JP | 2009100634 | 5/2009 |
| JP | 2009171785 | 7/2009 |
| JP | 2010213536 | 9/2010 |
| JP | 2012010595 | 1/2012 |
| JP | 2012223024 | 11/2012 |
| JP | 2014007926 | 1/2014 |
| JP | 2014018074 | 1/2014 |
| JP | 2014079056 | 5/2014 |
| JP | 2014083811 | 5/2014 |
| JP | 2014093917 | 5/2014 |
| JP | 2014138448 | 7/2014 |
| JP | 2014143919 | 8/2014 |
| JP | 2015039296 | 2/2015 |
| JP | 2015089169 | 5/2015 |

OTHER PUBLICATIONS

International Search Report for PCT/JP2016/004123 dated Nov. 24, 2016, 4 pages.
International Search Report for PCT/JP2016/082291 dated Jan. 18, 2017, 2 pages.
International Search Report for PCT/JP2017/012034 dated Jun. 12, 2017, 2 pages.
International Search Report for PCT/JP2017/014700 dated Jun. 29, 2017, 6 pages
Japanese Office Action for application No. JP2017528861 dated Jan. 16, 2018 4 pages.
Japanese Office Action for application No. JP2017200993 dated Feb. 13, 2018, 4 pages.
European Search Report for EP16898547.1 dated Nov. 11, 2019, 12 pages.
European Search Report for EP16898548.9 dated Nov. 11, 2019, 17 pages.

* cited by examiner

DEVICE, METHOD, AND JIG FOR MANUFACTURING MAGNET EMBEDDED CORE

CROSS REFERENCE TO RELATED APPLICATIONS

This application is the U.S. National Stage entry of International Application Number PCT/JP2017/014700 filed under the Patent Cooperation Treaty having a filing date of Apr. 10, 2017, which claims priority to international Application Number PCT/JP2016/002009 filed under the Patent Cooperation Treaty having a filing date of Apr. 13, 2016, International Application Number PCT/JP2016/004123 filed under the Patent Cooperation Treaty having a filing date of Sep. 9, 2016, International Application Number PCT/JP2016/082291 having a filing date of Oct. 31, 2016, and International Application Number PCT/JP2017/012034 having a filing date of Mar. 24, 2017, which are incorporated herein by reference.

TECHNICAL FIELD

The present invention relates to a device, a method and a jig for manufacturing a magnet embedded core having magnets embedded therein.

BACKGROUND ART

Conventionally, it is known to manufacture a magnet embedded core of rotating electric machinery by inserting a magnet into each of a plurality of magnet insertion holes extending axially in a rotor core, charging resin material in liquid form into the magnet insertion holes, and curing the charged resin material to fix the magnets in the rotor core. By fixing the magnets in the respective magnet insertion holes with the resin, the magnetic property of the rotor core can be stabilized, and the rotor core is enabled to follow the rotating magnetic field created by the stator in a stable manner.

In conjunction with such a method for manufacturing a magnet embedded core, it is known, for example, to place a rotor core, along with an intermediate die, in a mold die assembly having an upper die and a lower die, the lower die being provided with a tubular pot and a plunger vertically movable in the pot hole, and pressure-feed mold resin melted in the pot by moving the plunger upward such that the mold resin is charged into the magnet insertion holes of the rotor core via runners and gates formed between the intermediate die and the lower die, and is thereafter thermally cured. See Patent Document 1, for instance.

Patent Document 1: JP2014-79056A

SUMMARY OF THE INVENTION

Task to be Accomplished by the Invention

According to the prior art such as that disclosed in Patent Document 1, when the mold die assembly is opened and the molded rotor core is removed after the resin molding, cured resin inevitably remains in the runners or the likes, and this remaining resin (unnecessary resin) is eventually separated from the rotor core and discarded. Therefore, in view of minimizing material cost of the resin material or from other points of view, it is desirable to prevent such unnecessary resin from being created in the manufacture of a magnet embedded core.

The present invention was made in view of such a problem of the prior art, and has a primary object to prevent creation of unnecessary resin when fixing a magnet with resin.

Means to Accomplish the Task

One aspect of the present invention provides a manufacturing method for manufacturing a magnet embedded core including a rotor core formed with a magnet insertion hole passed axially through the rotor core, the magnet insertion hole having openings at both ends, and a magnet embedded in resin filling the magnet insertion hole, comprising: a placing step of placing the rotor core on a mounting table such that an end surface of the rotor core is in contact with the mounting table; a resin charging step of charging the resin in solid state into the magnet insertion hole; a melting step of melting the resin in the magnet insertion hole; a magnet inserting step of inserting the magnet into the magnet insertion hole; a closure step of closing the opening of the magnet insertion hole remote from the mounting table; and a resin pressurizing step of pressurizing the molten resin that has flowed into a buffer chamber formed in the mounting table from the opening of the magnet insertion hole on a side of the mounting table following the closure step.

In this method, because the resin in solid state is charged into the magnet insertion hole, and melted therein, no resin passage for conducting the resin melted externally of the magnet insertion hole is required so that the creation of unnecessary resin can be prevented. Furthermore, because the molten resin that has flowed into the buffer chamber is pressurized therein with one of the openings of the magnet insertion hole closed, the molten resin in the magnet insertion hole is pressurized so that the molten resin is allowed to permeate in the gap between the magnet in the magnet insertion hole and the rotor core, and the strength of the cured resin in fixing the magnet can be stabilized and improved.

In this manufacturing method for manufacturing a magnet embedded core, preferably, the resin pressurizing step includes pushing back at least a part of the resin in the buffer chamber into the magnet insertion hole via a pressurization of the resin.

Thereby, the molten resin is allowed to permeate in the gap between the magnet in the magnet insertion hole and the rotor core in a favorable manner without fail.

In this manufacturing method for manufacturing a magnet embedded core, preferably, the resin pressurizing step is performed by a first piston moveably provided in the buffer chamber.

Thereby, the molten resin in the buffer chamber can be pressurized by the first piston in a reliable manner.

In this manufacturing method for manufacturing a magnet embedded core, preferably, the magnet insertion hole comprises a plurality of magnet insertion holes, and the buffer chamber comprises a plurality of buffer chambers provided so as to correspond to the respective magnet insertion holes, wherein the molten resin in each buffer chamber is pressurized by a hydraulic drive device provided in each buffer chamber, and hydraulic pressure is supplied to the respective drive devices via a common manifold passage.

Thereby, the molten resin in the buffer chambers and the magnet insertion holes can be performed evenly.

In this manufacturing method for manufacturing a magnet embedded core, preferably, the resin pressurizing step includes venting air in the magnet insertion hole to outside via an air vent passage communicating with at least one of the opening of the magnet insertion hole on a side of the mounting table and the opening of the magnet insertion hole remote from the mounting table.

Thereby, even when air should remain in the magnet insertion holes during the pressurization of the molten resin in the magnet insertion holes, the remaining air can be vented via the air vent passage in a favorable manner so that the molten resin is allowed to permeate in the gap between the magnet in the magnet insertion hole and the rotor core in a favorable manner without fail.

In this manufacturing method for manufacturing a magnet embedded core, preferably, the buffer chamber opens out at a supporting surface for the rotor core to have an opening area smaller than an opening area of the magnet insertion hole and communicates with the magnet insertion hole.

Thereby, the solid resin and the magnet that have been charged into the magnet insertion hole are prevented from dropping into the buffer chamber.

In this manufacturing method for manufacturing a magnet embedded core, preferably, an opening of the buffer chamber at a supporting surface at least partly overlaps with the opening of the magnet insertion hole on a side of the mounting table, the method further comprising a removal step of removing the rotor core from the mounting table while the resin in the buffer chamber is connected to the resin in the magnet insertion hole at an overlapping portion.

Thereby, no resin remains in the buffer chamber after the rotor core is removed from the mounting table so that the work to remove resin from the buffer chamber is not required.

In this manufacturing method for manufacturing a magnet embedded core, preferably, an opening of the buffer chamber at a supporting surface does not overlap with the opening of the magnet insertion hole on a side of the mounting table, and the two openings are communicated with each other via a communication groove formed in the supporting surface, the method further comprising a removal step of removing the rotor core from the mounting table while the resin in the buffer chamber is connected to the resin in the magnet insertion hole by the resin in the communication groove.

Thereby, no resin remains in the buffer chamber after the rotor core is removed from the mounting table so that the work to remove resin from the buffer chamber is not required.

In this manufacturing method for manufacturing a magnet embedded core, preferably, a plate is interposed between the mounting table and the rotor core, and an opening of the buffer chamber at a supporting surface communicates with the opening of the magnet insertion hole on a side of the mounting table via a through hole formed in the plate, the method further comprising a removal step of removing the rotor core from the mounting table together with the plate while the resin in the buffer chamber is connected to the resin in the magnet insertion hole by the resin in the through hole.

Thereby, no resin remains in the buffer chamber after the rotor core is removed from the mounting table so that the work to remove resin from the buffer chamber is not required.

Another aspect of the present invention provides a manufacturing device for manufacturing a magnet embedded core including a rotor core formed with a magnet insertion hole passed axially through the rotor core, the magnet insertion hole having openings at both ends, and a magnet embedded in resin filling the magnet insertion hole, comprising: a mounting table configured to support the rotor core thereon, and including a buffer chamber communicating with the magnet insertion hole of the rotor core to receive molten resin therein; a heating device configured to melt the resin in solid state in the magnet insertion hole by heating the rotor core placed on the mounting table; a closure member configured to close the opening of the magnet insertion hole remote from the mounting table; and a resin pressurizing device configured to pressurize the molten resin in the buffer chamber.

In this structure, because the resin in solid state is charged into the magnet insertion hole, and melted therein, no resin passage for conducting the resin melted externally of the magnet insertion hole is required so that the creation of unnecessary resin can be prevented. Furthermore, because the molten resin that has flowed into the buffer chamber is pressurized therein with one of the openings of the magnet insertion hole closed, the molten resin in the magnet insertion hole is pressurized so that the molten resin is allowed to permeate in the gap between the magnet in the magnet insertion hole and the rotor core, and the strength of the cured resin in fixing the magnet can be stabilized and improved.

In this manufacturing device for manufacturing a magnet embedded core, preferably, the resin pressurizing device comprises a first piston moveably provided in the buffer chamber to pressurize the molten resin in the buffer chamber.

Thereby, the molten resin in the buffer chamber can be pressurized by the first piston in a reliable manner.

This manufacturing device for manufacturing a magnet embedded core, preferably, further comprises a base supporting the mounting table, the resin pressurizing device comprising a second piston provided in the base to pressurize the first piston, and a drive device configured to drive the second piston.

Thereby, the first piston is pressed by the hydraulically driven second piston. Since the first and second pistons can be formed so as to be separable from each other, the mounting table can be separated from the base.

In this manufacturing device for manufacturing a magnet embedded core, preferably, the magnet insertion hole comprises a plurality of magnet insertion holes, and the buffer chamber comprises a plurality of buffer chambers provided so as to correspond to the respective magnet insertion holes, wherein the drive device is a hydraulic device, the second piston and a cylinder chamber for the second piston being provided for each of the buffer chambers, and hydraulic pressure is supplied to the respective cylinder chambers via a common manifold passage.

Thereby, the molten resin in the buffer chambers and the magnet insertion holes can be performed evenly.

Preferably, the manufacturing device for manufacturing a magnet embedded core further comprises a base supporting the mounting table, the resin pressurizing device comprising a third piston provided in the base to pressurize the molten resin iii the buffer chamber, and a drive device configured to drive the third piston.

Thereby, the molten resin in the buffer chamber can be pressurized by using a simple structure.

In this manufacturing device for manufacturing a magnet embedded core, preferably, the magnet insertion hole comprises a plurality of magnet insertion holes, and the buffer chamber comprises a plurality of buffer chambers provided so as to correspond to the respective magnet insertion holes, wherein the drive device is a hydraulic device, the third piston and a cylinder chamber for the third piston being provided for each of the buffer chambers, and hydraulic pressure is supplied to the respective cylinder chambers via a common manifold passage.

Thereby, the molten resin in the buffer chambers and the magnet insertion holes can be performed evenly.

In this manufacturing device for manufacturing a magnet embedded core, preferably, the buffer chamber opens out at a supporting surface for the rotor core to have an opening area smaller than an opening area of the magnet insertion hole and communicates with the magnet insertion hole.

Thereby, the solid resin and the magnet that have been charged into the magnet insertion hole are prevented from dropping into the buffer chamber.

In this manufacturing device for manufacturing a magnet embedded core, preferably, an opening of the buffer chamber at a supporting surface at least partly overlaps with the opening of the magnet insertion hole on a side of the mounting table.

Thereby, the rotor core can be removed from the mounting table with the resin in the buffer chamber connected to the resin in the magnet insertion hole at an overlapping portion. As a result, no resin remains in the buffer chamber after the rotor core is removed from the mounting table so that the work to remove resin from the buffer chamber is not required.

In this manufacturing device for manufacturing a magnet embedded core, preferably, an opening of the buffer chamber at a supporting surface does not overlap with the opening of the magnet insertion hole on a side of the mounting table, and the supporting surface is formed with a communication groove communicating the two openings with each other.

Thereby, the rotor core can be removed from the mounting table with the resin in the buffer chamber connected to the resin in the magnet insertion hole by the resin in the communication groove. As a result, no resin remains in the buffer chamber after the rotor core is removed from the mounting table so that the work to remove resin from the buffer chamber is not required.

This manufacturing device for manufacturing a magnet embedded core, preferably, further comprises a plate interposed between the mounting table and the rotor core, and having a through hole communicating the buffer chamber with the magnet insertion hole.

Thereby, the rotor core can be removed from the mounting table with the resin in the buffer chamber connected to the resin in the magnet insertion hole by the resin in the through hole. As a result, no resin remains in the buffer chamber after the rotor core is removed from the mounting table so that the work to remove resin from the buffer chamber is not required.

In this manufacturing device for manufacturing a magnet embedded core, preferably, the closure member has an air vent passage communicating the opening of the magnet insertion hole remote from the mounting table with outside.

Thereby, even when air should remain in the magnet insertion holes during the pressurization of the molten resin in the magnet insertion holes, the remaining air can be vented via the air vent passage in a favorable manner so that the molten resin is allowed to permeate in the gap between the magnet in the magnet insertion hole and the rotor core in a favorable manner without fail.

In this manufacturing device for manufacturing a magnet embedded core, preferably, the mounting table has an air vent passage communicating the opening of the magnet insertion hole on a side of the mounting table with outside.

Thereby, even when air should remain in the magnet insertion holes during the pressurization of the molten resin in the magnet insertion holes, the remaining air can be vented via the air vent passage in a favorable manner so that the molten resin is allowed to permeate in the gap between the magnet in the magnet insertion hole and the rotor core in a favorable manner without fail.

Yet another aspect of the present invention provides a manufacturing jig for manufacturing a magnet embedded core including a rotor core formed with a magnet insertion hole passed axially through the rotor core, the magnet insertion hole having openings at both ends, and a magnet embedded in resin filling the magnet insertion hole, comprising: a pair of clamping plates axially interposing the rotor core therebetween; and a coupling device detachably coupling the clamping plates to each other.

This manufacturing jig is able to retain the rotor core by itself, and can be configured to be detachable to the manufacturing device so that the operation efficiency of the manufacturing device can be improved.

In this manufacturing jig for manufacturing a magnet embedded core, preferably, one of the clamping plates is provided with a buffer chamber communicating with one of the openings of the magnet insertion hole, and a piston configured to pressurize the resin in the buffer chamber.

Thereby, the base is not required to be provided with a buffer chamber and a piston so that the structure of the base can be simplified.

In this manufacturing jig for manufacturing a magnet embedded core, preferably, the other of the clamping plates is provided with an insertion hole for the resin and the magnet communicating with the other opening of the magnet insertion hole.

Thereby, the resin and the magnet can be charged into the magnet insertion hole while the rotor core is retained by the manufacturing jig so that the operation efficiency of the manufacturing device can be improved.

In this manufacturing jig for manufacturing a magnet embedded core, preferably, the other of the clamping plates is provided with a closure portion configured to close the other opening of the magnet insertion hole.

Thereby, the rotor core can be retained and the other opening of the magnet insertion hole can be closed by using the manufacturing jig so that the operation efficiency of the manufacturing device can be improved.

Effects of the Invention

Thus, according to the aspects of the present invention, creation of unnecessary resin is prevented when fixing a magnet with resin.

BRIEF DESCRIPTION OF THE DRAWING(S)

EMBODIMENT(S) FOR CARRYING OUT THE INVENTION

Figure 1:
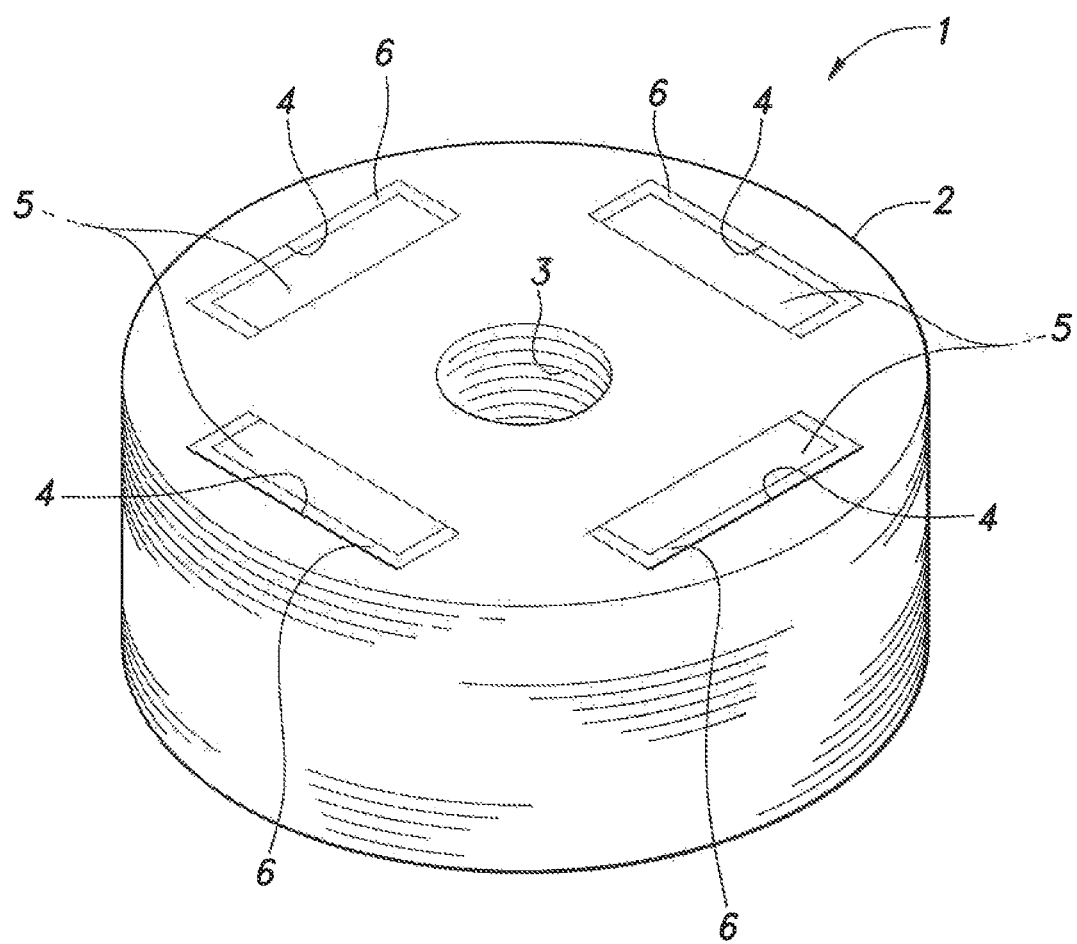
FIG. 1 is a perspective view of an example of a magnet embedded rotor manufactured by a manufacturing method and a manufacturing device according to a first embodiment of the present invention.

Preferred embodiments of the present invention are described in the following with reference to the appended drawings.

First of all, an example of a magnet embedded core manufactured by a manufacturing device and a manufacturing method according to an embodiment of the present invention is described in the following with reference to FIGS. 1 and 2.

A magnet embedded core 1 is a component part of rotating machinery such as an electric motor, and includes a rotor core 2. The rotor core 2 consists of a laminated iron core formed by laminating a plurality of electromagnetic steel sheets and joining the electromagnetic steel sheets together by using a per se known joining method (such as crimping, laser welding, etc.). The rotor core 2 is substantially annular in shape in plan view, and is centrally provided with a shaft hole 3.

The rotor core 2 is formed with a plurality of magnet insertion holes 4 each defining a substantially rectangular space. The magnet insertion holes 4 extend through the rotor core 2 in an axial direction, and each open out at both of the end surfaces of the rotor core 2. The magnet insertion holes 4 are formed in four locations that are circumferentially arranged at a regular interval. However, the magnet insertion holes 4 are not limited to this embodiment, but can be arranged in any other different way with regard to shape, number and arrangement.

A substantially rectangular parallelepiped shaped magnet 5 is received in each magnet insertion hole 4. Each magnet 5 may consist of, for example, a ferrite-based sintered magnet or a permanent magnet (with or without magnetization) such as a neodymium magnet. The dimensions of each magnet 5 are slightly smaller than the corresponding dimensions of the magnet insertion hole 4. As a result, a gap is created between the rotor core 2 and each magnet 5, and is filled by resin 6 which fixes the magnet 5 to the rotor core 2. The resin 6 may consist of thermosetting resin such as epoxy resin.

Figure 2:
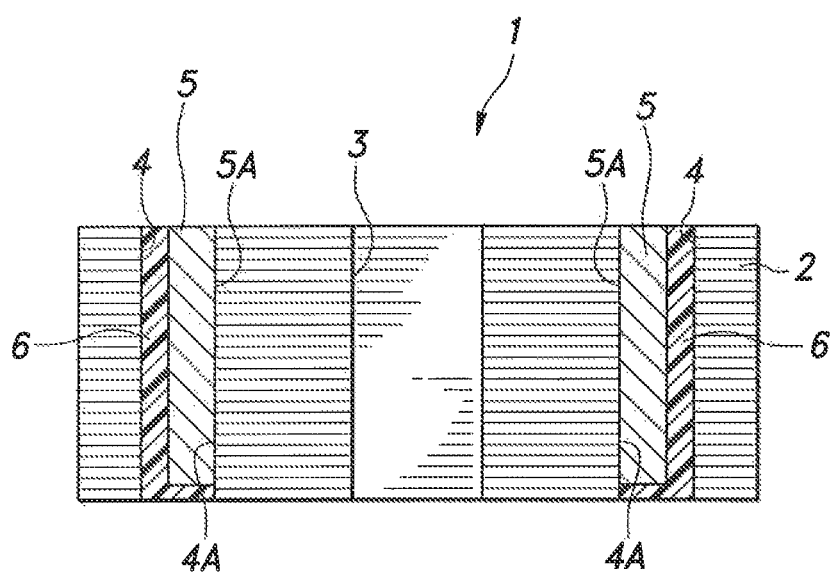
FIG. 2 is a vertical sectional view of the magnet embedded rotor.

As shown in FIG. 1, the magnet 5 in each magnet insertion hole 4 is inwardly offset (or offset toward the center of the rotor core 2) so that the outer surface 5A of the magnet 5 on the inner side thereof makes a surface contact with (abuts against) the inner surface 4A of the magnet insertion hole 4 on the inner side thereof. Thereby, the magnets 5 are uniformly arranged in regard to the radial positioning thereof, and are arranged also in regard to the circumferential positioning thereof with respect to the rotor core 2 so that the magnets 5 are prevented from causing any rotational imbalance. The magnets 5 may also be offset in the opposite radial direction from that shown in FIG. 1 (or offset away from the center of the rotor core 2).

Figure 3:
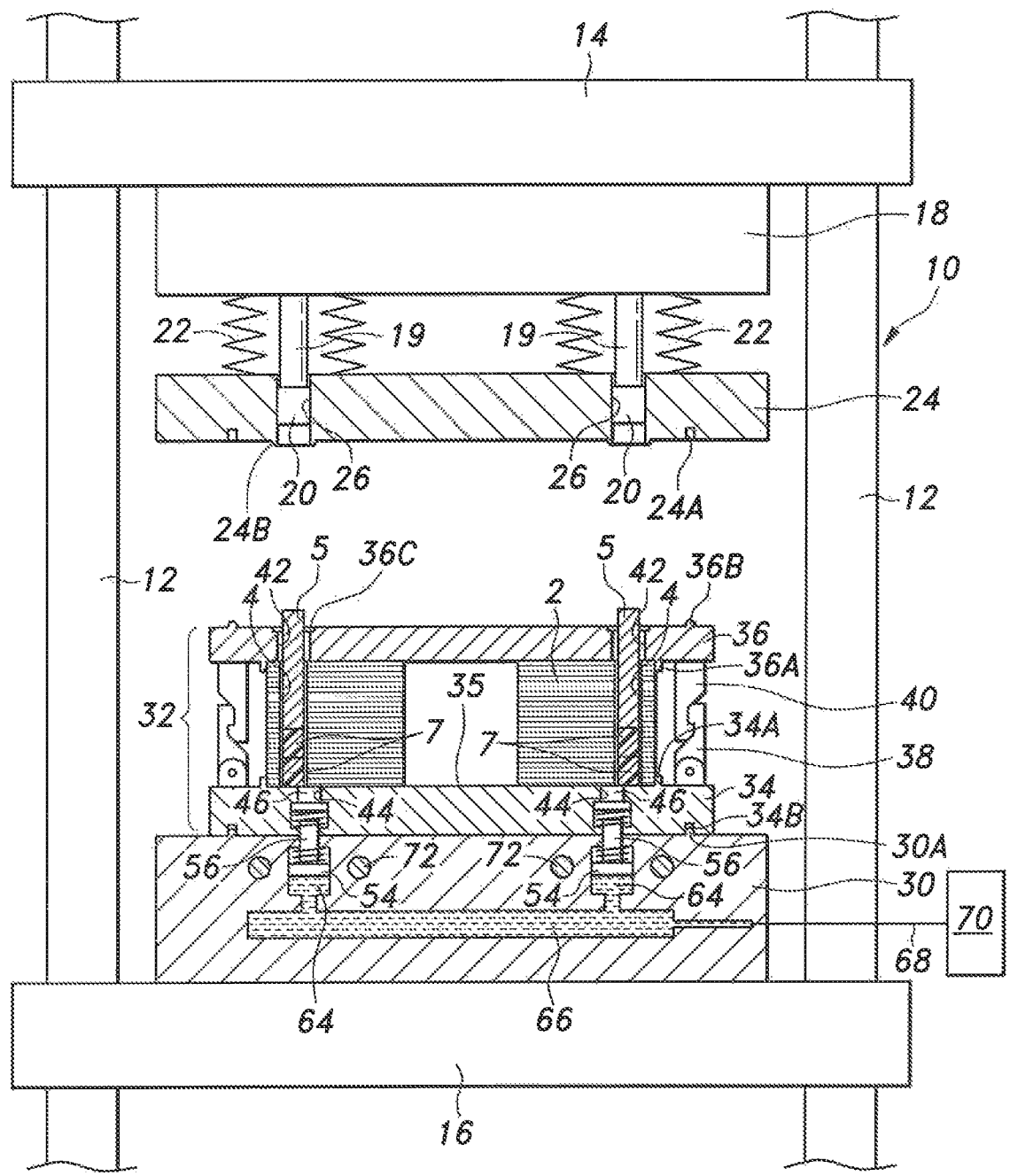
FIG. 3 is a vertical section view of the manufacturing device for a magnet embedded rotor according to the first embodiment of the present invention in a resin charging and a magnet inserting step.

A manufacturing device 10 for the magnet embedded core 1 of the illustrated embodiment is described in the following with reference to FIG. 3.

The manufacturing device 10 is provided with a press structure that includes a plurality of vertically extending tie bars 12, a plate-shaped fixed platen 16 fixedly attached to lower parts of the tie bars 12, and a plate-shaped moveable platen 14 vertically moveably supported by the tie bars 12 above the fixed platen 16. The moveable platen 14 can be driven vertically by a die clamping device not shown in the drawings which may be based on a per se known toggle-link mechanism or feed screw mechanism.

An upper die 18 is fixedly attached to the lower bottom surface of the moveable platen 14. The upper die 18 fixedly supports a plurality of closure members 20 via respective rods 19 projecting downward from the lower surface of the upper die 18, and suspends a core pressing member 24 via springs 22. The closure members 20 are provided so as to correspond to the respective magnet insertion holes 4, and are each formed into a rectangular shape in plan view which is larger than the plan view shape of the corresponding magnet insertion hole 4. The core pressing member 24 is formed with through holes 26 which receive the respective closure members 20 in the vertical direction. Alternatively, the closure member 20 may have a plan view shape which covers two or more of the adjoining magnet insertion holes 4 so that the structure of the manufacturing device 10 may be simplified.

Figure 10:
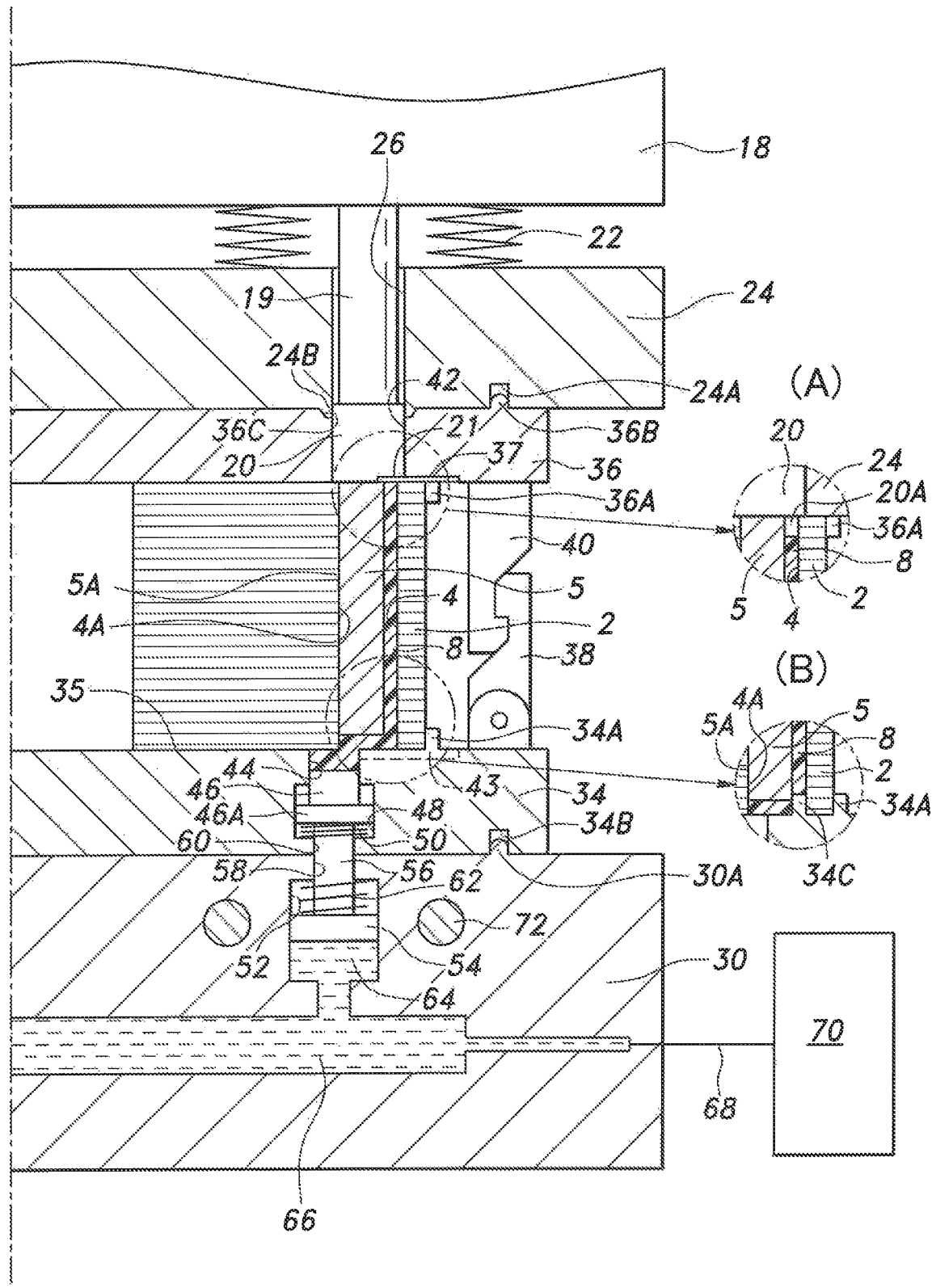
FIG. 10 is an enlarged fragmentary vertical sectional view showing the second half of the closure step and the melting step in the manufacturing method for a magnet embedded rotor according to the first embodiment of the present invention.

The closure members 20 as well as an upper clamping plate 36 which will be described hereinafter are provided with air vent passages 21 and 37 for communicating the upper openings of the magnet insertion holes 4 with the atmosphere as shown in FIG. 10. The air vent passages 21 and 37 are provided with small cross sectional areas that will permit free air flow but produce a significant flow resistance to the flow of the molten resin.

A lower die (base) 30 is fixedly attached to the upper surface of the fixed platen 16. The lower die 30 supports a rotor core retainer 32 on the upper surface thereof, the rotor core retainer 32 being a manufacturing jig that can be conveyed onto and away from the upper surface of the lower die 30.

The rotor core retainer 32 includes a plate-shaped lower clamping plate 34 and a plate-shaped upper clamping plate 36. The lower clamping plate 34 is formed as a mounting table for placing the rotor core 2 thereon, and clamps the rotor core 2 in cooperation with the upper clamping plate 36. More specifically, the lower clamping plate 34 and the upper clamping plate 36 vertically oppose each other, and clamp the rotor core 2 therebetween in the axial or vertical direction.

The lower clamping plate 34 and the upper clamping plate 36 are each provided with projections 34A, 36A that engage the outer periphery of the rotor core 2. Therefore, the rotor core 2 is kept properly positioned by the projections 34A and 36A while being clamped between the lower clamping plate 34 and the upper clamping plate 36 in the vertical or axial direction. The term "positioned" as used herein means that the position of the rotor core 2 with respect to the rotor core retainer 32 is uniquely determined. The projections 34A and 36A may also consist of members that can be inserted into holes (not shown in the drawings) formed in the lower clamping plate 34 and the upper clamping plate 36.

The lower clamping plate 34 is provided with moveable engagement claws 38, and the upper clamping plate 36 is provided with corresponding fixed engagement claws 40. The moveable engagement claws 38 and the fixed engagement claws 40 form a coupling device, and can be detachably engaged with each other so as to couple the lower clamping plate 34 and the upper clamping plate 36 to each other with the rotor core 2 interposed therebetween. The rotor core retainer 32 can be conveyed into and out of the lower die 30 with the rotor core 2 kept clamped by the rotor core retainer 32.

The lower clamping plate 34 and the lower die 30 are formed with recesses 34B and projections 30A, respectively, that are configured to engage each other so that the position of the lower clamping plate 34 relative to the lower die 30 is uniquely determined. The upper clamping plate 36 and the core pressing member 24 are formed with projections 36B and recesses 24A that are configured to engage with each other so that the position of the upper clamping plate 36 relative to the core pressing member 24 is uniquely determined. Thereby, the position to which the rotor core retainer 32 is to be conveyed can be determined.

The upper clamping plate 36 is formed with insertion holes 42 that are vertically passed through at positions corresponding to the magnet insertion holes 4 of the rotor core 2, and are dimensioned to be slightly larger than the corresponding magnet insertion holes 4 so that the closure members 20 may be passed into the corresponding insertion holes 42. The insertion holes 42 may be similarly dimensioned as the through holes 26 formed in the core pressing member 24. The alignment between the insertion holes 42 and the corresponding closure members 20 can be accomplished by causing projections 24B (see FIG. 3) respectively formed around the through holes 26 to engage recesses 36C (see FIG. 3) respectively formed around the insertion holes 42 immediately before the core pressing member 24 and the upper clamping plate 36 abut each other (see FIG. 10). The alignment between the insertion holes 42 and the corresponding cloture members 20 may also be achieved by circumferentially aligning the rotor core retainer 32 with the lower die 30. The alignment between the insertion holes 42 and the corresponding magnet insertion holes 4 may also be achieved by circumferentially aligning the rotor core 2 with the rotor core retainer 32.

The closure members 20 are each provided with a projection 20A, and the lower clamping plate 34 is provided with projections 34C to position the magnets 5 in an offset relationship to the magnet insertion holes 4 such that one of the outer surfaces 5A of each magnet 5 is in contact with a corresponding one of the inner surfaces 4A of the corresponding magnet insertion hole 4 as shown in (A) and (B) of FIG. 10 which are enlarged sectional views taken along planes that are different from that of FIG. 10. The projections 20A and the projections 34C may also be arranged such that the radially outer surface of each magnet 5 is in contact with the corresponding inner surface of the corresponding magnet insertion hole 4.

The lower clamping plate 34 is formed with buffer chambers (overflow chambers) 44 which individually communicate with the lower openings of the respective magnet insertion holes 4 of the rotor core 2 placed on the lower clamping plate 34. The buffer chambers 44 are formed so as to correspond to the respective magnet insertion holes 4, and are each configured to receive a part of the resin 8 that has melted in the corresponding magnet insertion hole 4. Thus, each buffer chamber 44 is rectangular in plan view, and opens at a supporting surface 35 defined by the upper surface of the lower clamping plate 34 with an opening area smaller than the lower opening of the corresponding magnet insertion hole 4 in a partly overlapping relationship. Since the opening area of the buffer chamber 44 at the supporting surface 35 is smaller than the opening area of the magnet insertion hole 4 at the supporting surface 35, the magnet 5 charged into the magnet insertion hole 4 is prevented from dropping into the buffer chamber 44. Each buffer chamber 44 may also overlap with two or more of the magnet insertion holes 4. Alternatively, each buffer chamber 44 may not overlap with the magnet insertion holes 4, and may communicate with one or more of the magnet insertion holes 4 via a communication groove.

Each buffer chamber 44 receives a first piston 46 provided with a lower flange 46A (see FIG. 10) in a vertically (axially) slidable manner. The first pistons 46 are provided so as to individually correspond to the respective buffer chambers 44, and each form a resin pressurizing member that pressurizes the molten resin 8 received in the corresponding buffer chamber 44 by moving upward. As shown in FIG. 10, a piston chamber 48 having a larger diameter than the buffer chamber 44 is formed under each first piston 46 so that the uppermost position of the first piston 46 is defined by the abutment of the lower flange 46A onto a shoulder defined between the buffer chamber 44 and the piston chamber 48. The first piston 46 is normally urged upward by a compression coil spring 50 received in the piston chamber 48.

The lower die 30 is formed with cylinder bores 52 corresponding to the respective piston chambers 48. A second piston 54 is received in each cylinder bore 52 so as to be moveable in the vertical (axial) direction. Each second piston 54 is provided with a piston rod 56 which is passed upwardly through a through hole 58 formed in the lower die 30 to project above the lower die 30, and passed into a through hole 60 formed in the lower clamping plate 34 to abut onto the lower surface of the corresponding first piston 46. A compression coil spring 62 is received in each cylinder bore 52 to urge the corresponding second piston 54 downward.

The lower die 30 thus defines a cylinder chamber 64 serving as a pressurizing chamber under each second piston 54. The cylinder chambers 64 are thus formed so as to correspond to the respective second pistons 54, and hence to the respective buffer chambers 44. The cylinder chambers 64 are connected to a hydraulic device 70 via a manifold passage 66 formed in the lower die 30 and external piping 68 so as to receive hydraulic pressure from the hydraulic device 70 as required. Each second piston 54 can be thus pushed upward against the spring force of the compression coil spring 62 to push (pressurize) the corresponding first piston 46 upward via the piston rod 56 when hydraulic pressure is supplied thereto from the hydraulic device 70.

In this structure in which the first piston 46 serving as the resin pressurizing member for pressurizing the molten resin 8, the second piston 54, and the cylinder chamber 64 are provided for each buffer chamber 44, the pressurized oil is supplied to the cylinder chambers 64 via the common manifold passage 66 so that the pressure can be evenly distributed among the cylinder chambers 64. Therefore, the pressure (resin pressure) when molding the molten resin 8 in the buffer chambers 44 and the magnet insertion holes 4 is evenly distributed among them so that the molding in each magnet insertion hole 4 of the rotor core 2 can be performed in a uniform manner.

The lower die 30 is incorporated with an electric heater (heating device) 72.

The various steps of the manufacturing method for the magnet embedded core of the first embodiment are described in the following with reference to FIGS. 4 to 13.

Figure 4:
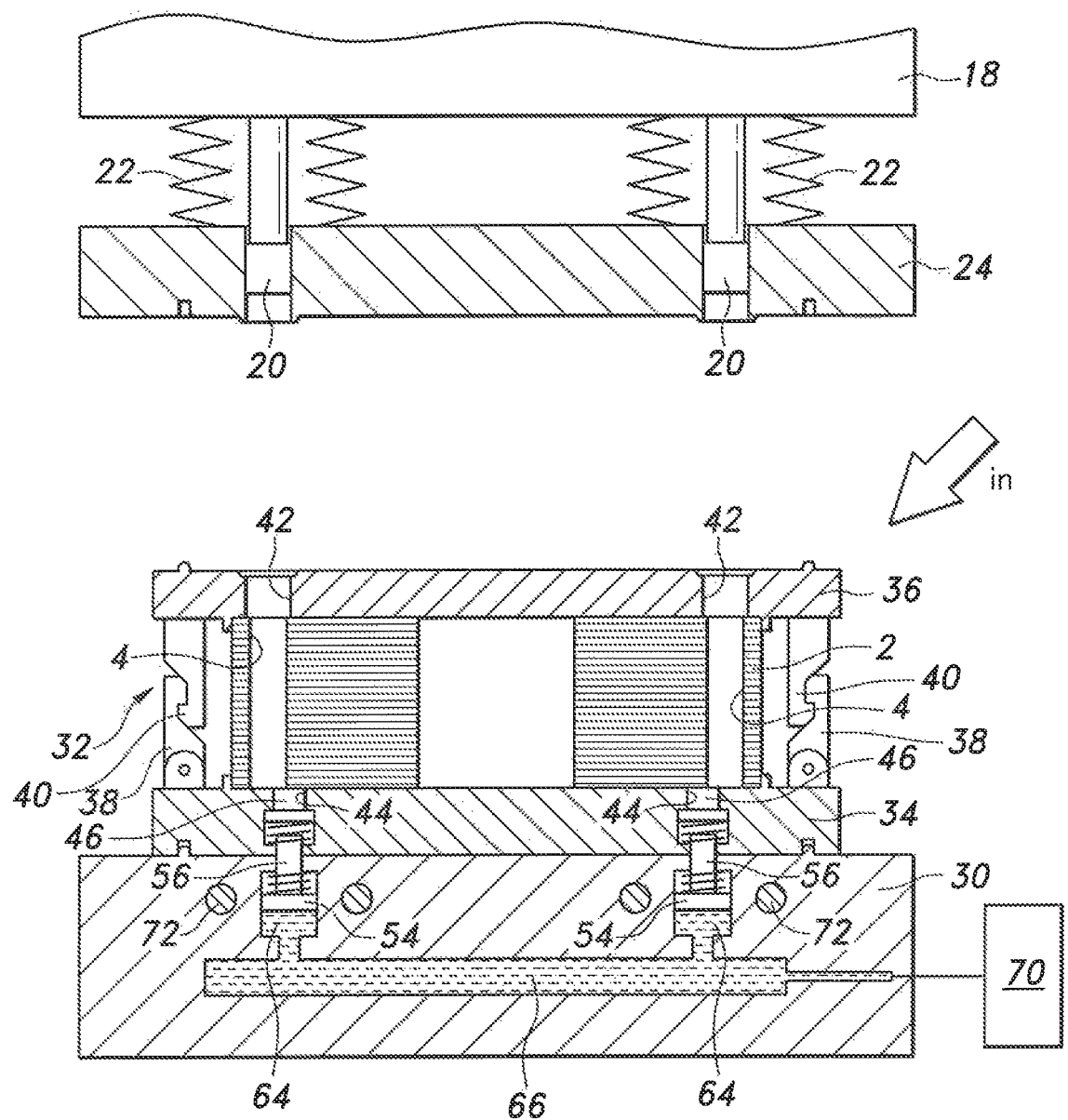
FIG. 4 is a fragmentary vertical sectional view showing a placing step in the manufacturing method for a magnet embedded rotor according to the first embodiment of the present invention.

First of all, as shown in FIG. 4, with the moveable platen 14 (see FIG. 3) in the raised state, the rotor core retainer 32 having the rotor core 2 clamped between the lower clamping plate 34 and the upper clamping plate 36 which are connected to each other via the moveable engagement claws 38 and the fixed engagement claws 40 or the rotor core retainer 32 having the rotor core 2 set thereon is conveyed onto the lower die 30. The rotor core 2 may be preheated in a heating oven (not shown in the drawings) provided outside of the manufacturing device 10 for reducing the heating time that is performed in the manufacturing device 10 (in particular, the pressing structure thereof). Such a preheating step may be performed while the rotor core 2 is either set on the rotor core retainer 32 or not set on the rotor core retainer 32.

Figure 5:
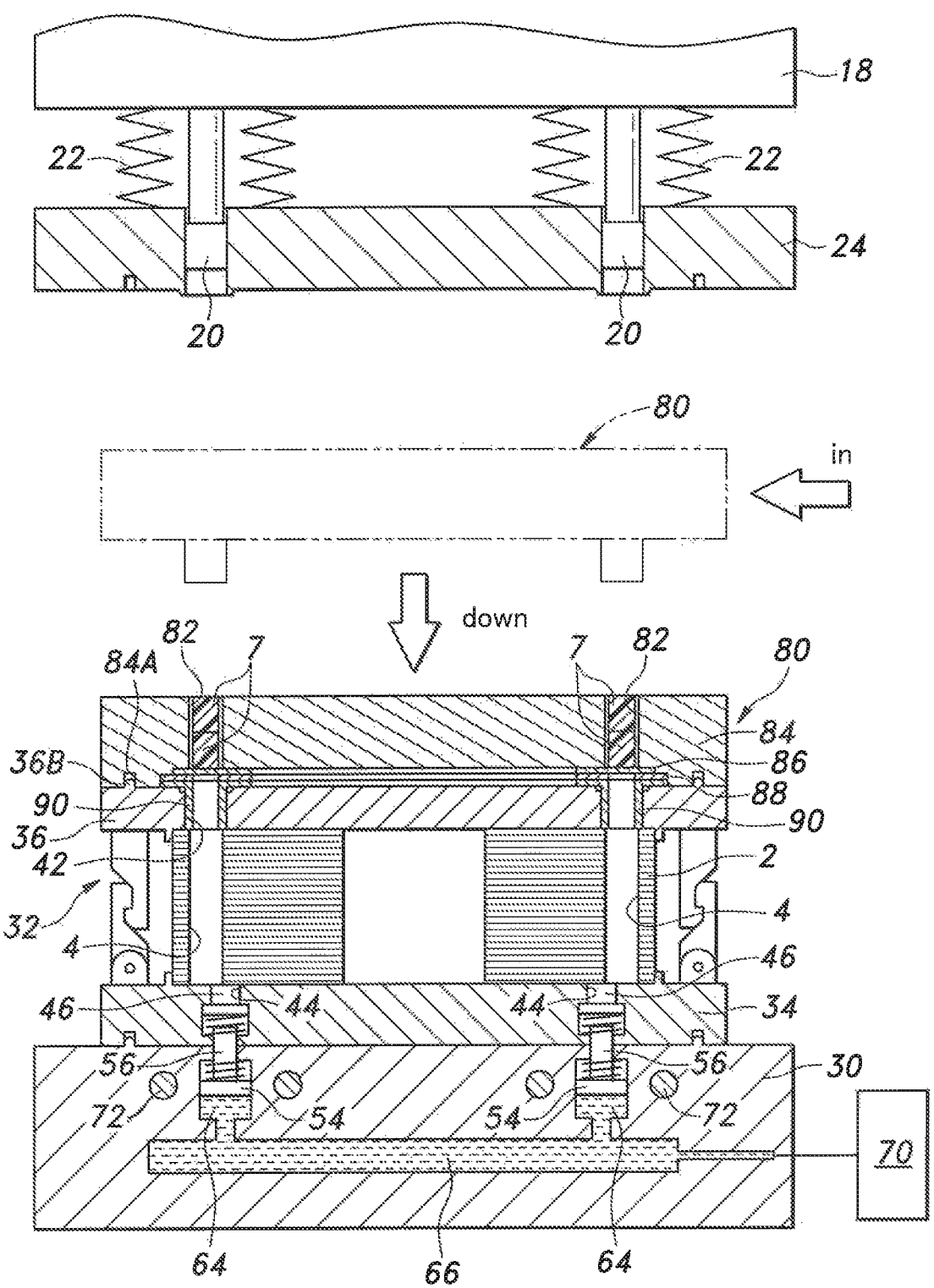
FIG. 5 is a fragmentary vertical sectional view showing a resin charging step in the manufacturing method for a magnet embedded rotor according to the first embodiment of the present invention.

In a following resin charging step, a resin charging device 80 is set on the upper clamping plate 36 as shown in FIG. 5. The resin charging device 80 includes a main body 84 provided with resin retaining holes 82 corresponding to the respective magnet insertion holes 4, a shutter plate 86 that selectively opens the lower openings of the resin retaining holes 82 and are normally closed, a shutter retaining plate 88, and a tubular resin guide members 90 attached to the shutter retaining plate 88 so as to correspond to the respective resin retaining holes 82. The resin charging device 80 can be positioned relative to the upper clamping plate 36 by engaging projections 36B formed on the upper clamping plate 36 with recesses 84A formed in the main body 84.

Resin in solid state (which will be referred to as solid resin 7 in the following disclosure) is placed in the resin retaining holes 82 in advance, and once the resin charging device 80 is set on the upper clamping plate 36, the resin guide members 90 are inserted in corresponding insertion holes 42 formed in the upper clamping plate 36.

The solid resin 7 may be of any configuration as long as the solid resin 7 can be charged into the magnet insertion holes 4 from the upper openings of the magnet insertion holes 4. The solid resin 7 may be uncured powder (before the chemical reaction is initiated by heating in the case of thermosetting resin), pellet resin formed by molding granular material resin having relatively small diameters and filler (which may include additives) into a columnar or any other desired shape by using a pelleting machine (not shown in the drawings), or resin in granular form having a relatively large diameter formed by molding uncured material resin in powder form. Such resin in molded form is favorable for not scattering into the air.

The volumetric amount of the solid resin 7 that is to be charged into each magnet insertion hole 4 is greater than the volume of the magnet insertion hole 4 minus the volume of the magnet 5 by a prescribed amount (excess amount). The solid resin 7 may not be in solid form in a narrow sense, but it suffices if the solid resin 7 is at least able to retain the shape thereof when being charged into the magnet insertion hole 4 (substantially non-fluid state). The volumetric amount of the solid resin 7 to be charged into each magnet insertion hole 4 should be determined such that when the magnet 5 is inserted into the magnet insertion hole 4, a small amount of the molten resin 8 (the resin obtained by melting the solid resin 7 which may be referred to simply as molten resin 8 in the following disclosure) overflows from the magnet insertion hole 4. If the molten resin 8 that has overflown from the magnet insertion hole 4 can be entirely returned to the magnet insertion hole 4 in a subsequent manufacturing step, the volumetric amount of the solid resin 7 that is to be charged into each magnet insertion hole 4 may be equal to the volume of the magnet insertion hole 4 minus the volume of the magnet 5. This arrangement is desirable in that the required amount of the solid resin 7 can be reduced.

When the shutter plate 86 is opened with the resin charging device 80 set on the upper clamping plate 36, the solid resin 7 in each resin retaining hole 82 drops into the corresponding magnet insertion hole 4 via the resin guide member 90. In this case, as shown in FIG. 5, since inner periphery of the guide member 90 is generally smaller than that of the magnet insertion hole 4, and the guide member 90 is properly positioned relative to the corresponding magnet insertion hole 4, the solid resin 7 is allowed to drop into the magnet insertion hole 4 without being caught by an edge of the magnet insertion hole 4.

The electric heater 72 may be kept turned on at all times. Owing to the fact that the heat of the electric heater 72 is transmitted to the rotor core 2 via the lower die 30 and the lower clamping plate 34, as soon as the solid resin 7 drops into the magnet insertion holes 4, a melting step is initiated, or the solid resin 7 is melted in the magnet insertion holes 4. By preheating the rotor core 2 in the preheating step, the heating and the melting of the solid resin is accelerated so that the time period required for the molding process can be reduced.

Figure 6:
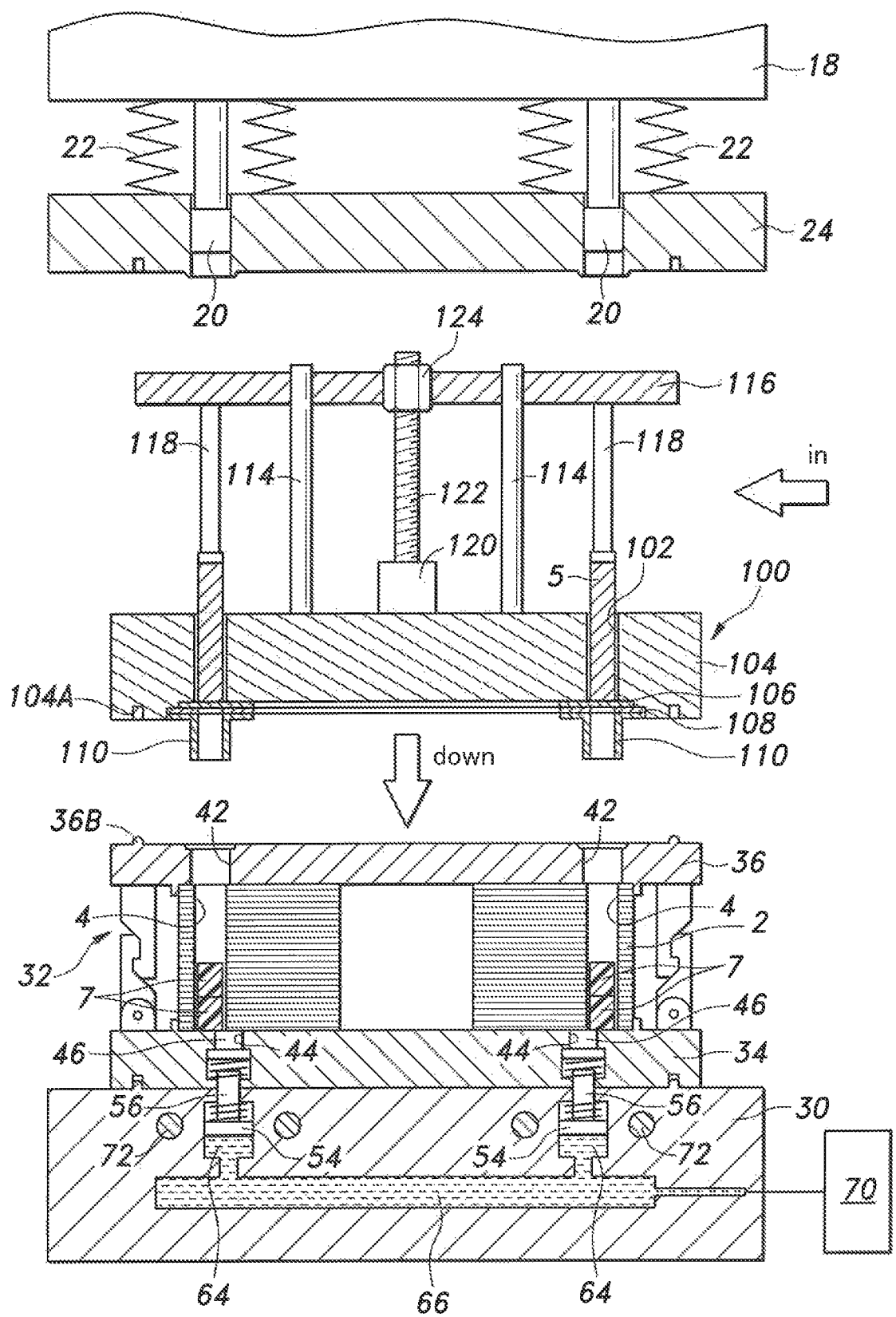
FIG. 6 is a fragmentary vertical sectional view showing a first half of a magnet inserting step in the manufacturing method for a magnet embedded rotor according to the first embodiment of the present invention.

Upon completion of the resin charging step, a magnet insertion step is performed. More specifically, as shown in FIG. 6, a magnet inserting device 100 is placed above the upper clamping plate 36, in place of the resin charging device 80. The magnet inserting device 100 includes a main body 104 provided with magnet retaining holes 102 corresponding to the respective magnet insertion holes 4, a shutter plate 106 that selectively opens the lower openings of the magnet retaining holes 102 and are normally closed, a shutter retaining plate 108, and tubular magnet guide members 110 attached to the shutter retaining plate 108 so as to correspond to the magnet retaining holes 102. The magnet inserting device 100 further includes a moveable plate 116 guided in a vertically moveable manner by a plurality of guide rods 114 extending upright from the main body 104, pressure rods 118 extending downward from the moveable plate 116 toward the respective magnet retaining holes 102, an electric motor 120 mounted on the main body 104, a feed screw rod 122 extending vertically and configured to be rotatively driven by the electric motor 120, and a feed nut 124 fixedly attached to the moveable plate 116 and threadably engaging the feed screw rod 122. A magnet 5 is already inserted into each magnet retaining hole 102. The magnet inserting device 100 can be positioned relative to the upper clamping plate 36 by engaging the projections 36B formed on the upper clamping plate 36 with recesses 104A formed in the main body 104.

Figure 7:
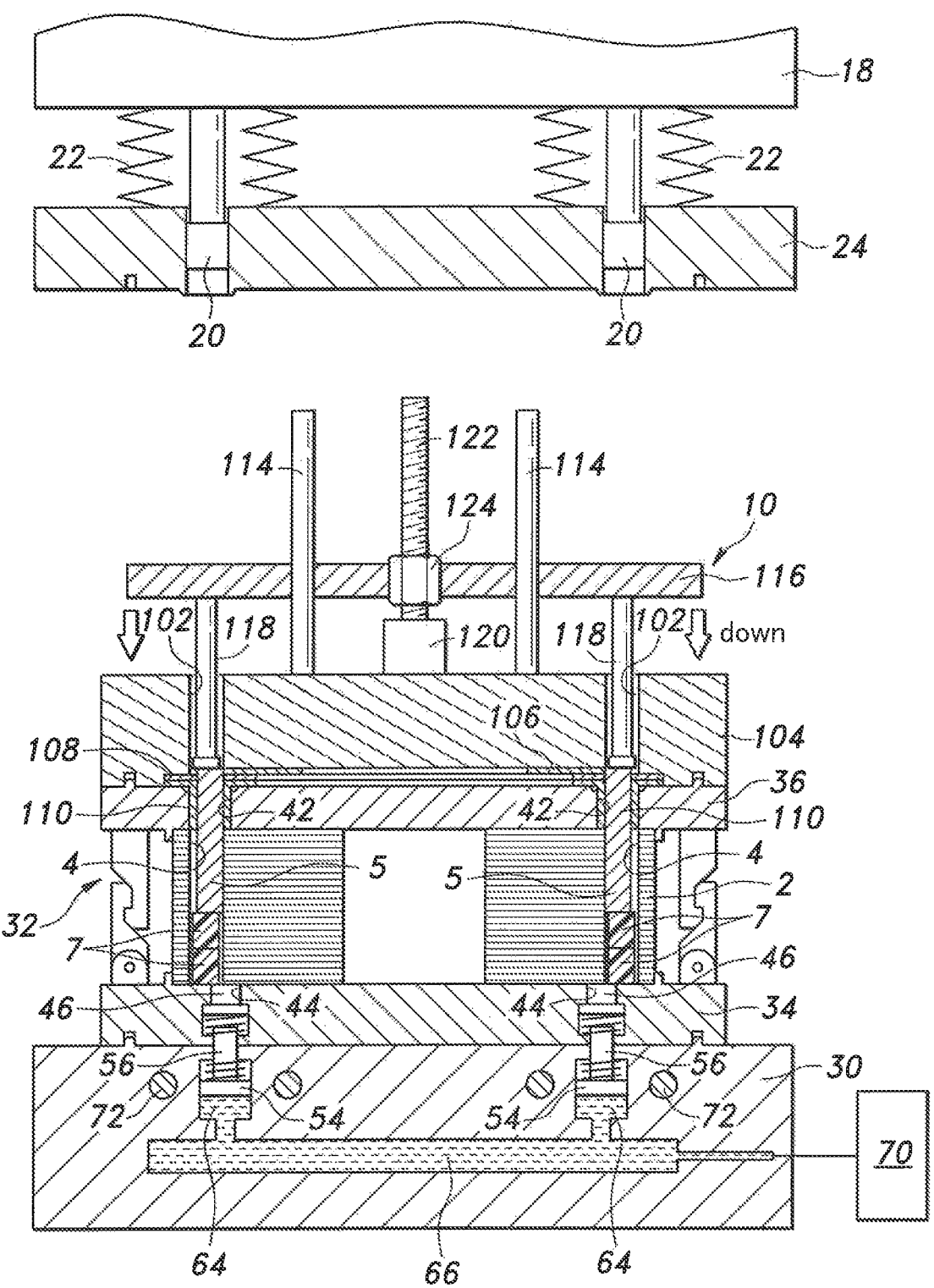
FIG. 7 is a fragmentary vertical sectional view showing a second half of the magnet inserting step in the manufacturing method for a magnet embedded rotor according to the first embodiment of the present invention.

As shown in FIG. 7, as the magnet inserting device 100 descends onto the upper clamping plate 36, the magnet guide members 110 are inserted into the corresponding insertion holes 42 of the upper clamping plate 36. As the shutter plate 106 is opened, and the feed screw rod 122 is rotatively driven by the electric motor 120, the moveable plate 116 descends relative to the main body 104 until the pressure rods 118 push the magnets 5 in the corresponding magnet retaining holes 102 into the respective magnet insertion holes 4 via the corresponding magnet guide members 110. The magnet guide members 110 are configured in a similar manner as the guide members 90 discussed above so that the magnets 5 can be inserted into the corresponding magnet insertion holes 4 in a smooth manner. During the step of pushing the magnets 5 into the respective magnet insertion holes 4 with the pressure rods 118, the magnets 5 may be pushed down to a vertical position where the magnets 5 come into contact with the solid resin 7 or may be pushed further down so as to initiate the step of causing the molten resin to fill the magnet insertion holes 4.

Figure 8:
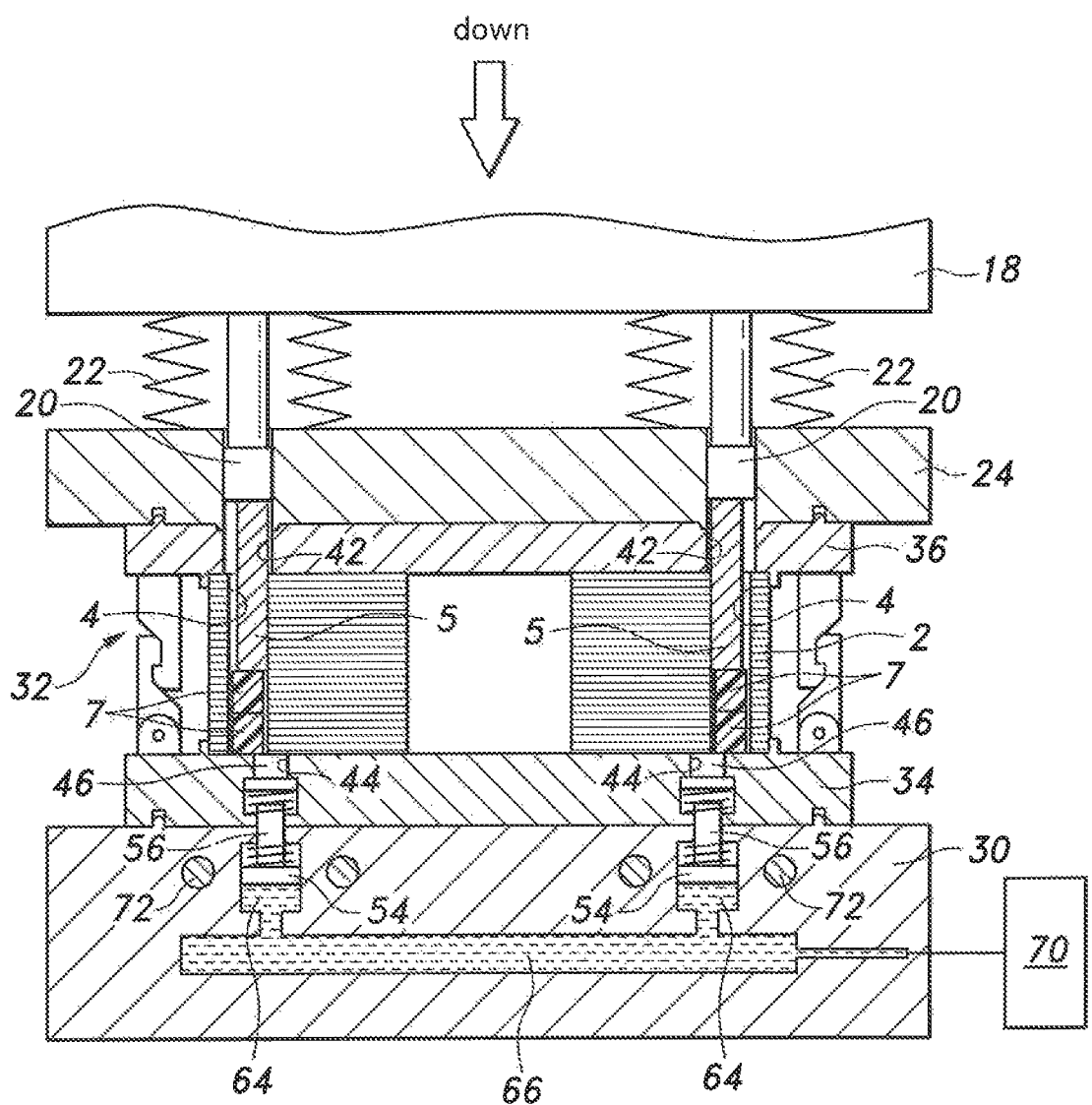
FIG. 8 is a fragmentary vertical sectional view showing a first half of a closure step in the manufacturing method for a magnet embedded rotor according to the first embodiment of the present invention.

Upon completion of the magnet inserting step, as shown in FIG. 8, the magnet inserting device 100 is removed, the moveable platen 14 (see FIG. 3) is lowered as a closure step causing the upper die 18 to be lowered until the upper clamping plate 36 abuts onto the core pressing member 24.

Figure 9:
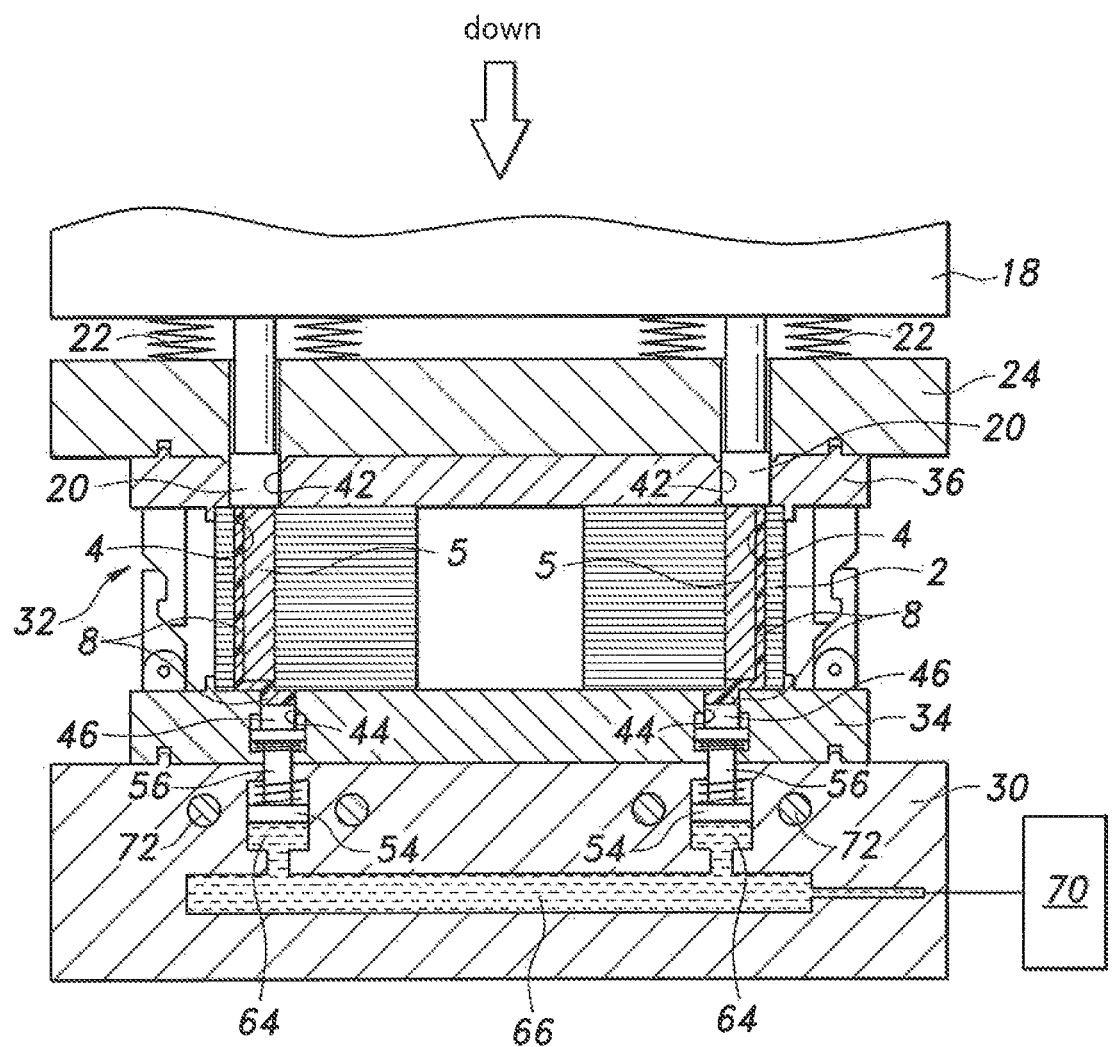
FIG. 9 is a fragmentary vertical sectional view showing a second half of the closure step and a melting step in the manufacturing method for a magnet embedded rotor according to the first embodiment of the present invention.

The closure members 20 then close the upper openings of the magnet insertion holes 4, and the magnets 5 are inserted into the magnet insertion holes 4. In the illustrated embodiment, as shown in FIG. 9, as the moveable platen 14 (see FIG. 3) descends, the springs 22 are compressed, and the closure members 20 advance into the corresponding insertion holes 42 causing the magnets 5 to be pushed further into the magnet insertion holes 4. The closure members 20 eventually come into contact with the rotor core 2 so that the upper openings of the magnet insertion holes 4 are closed by the closure members 20. This concludes the closure step.

At this time, as shown in FIG. 10, a part of the molten resin 8 flows into the buffer chambers 44 from the lower openings of the magnet insertion holes 4 causing the first pistons 46 to be pushed down against the spring forces of the respective compression coil springs 50. In each magnet insertion hole 4, the molten resin 8 fills the gap defined by a side surface of the magnet 5. Since the upper openings of the magnet insertion holes 4 have been closed by the respective closure members 20 in the previous step, the molten resin 8 is prevented from overflowing from the upper openings of the magnet insertion holes 4.

Figure 11:
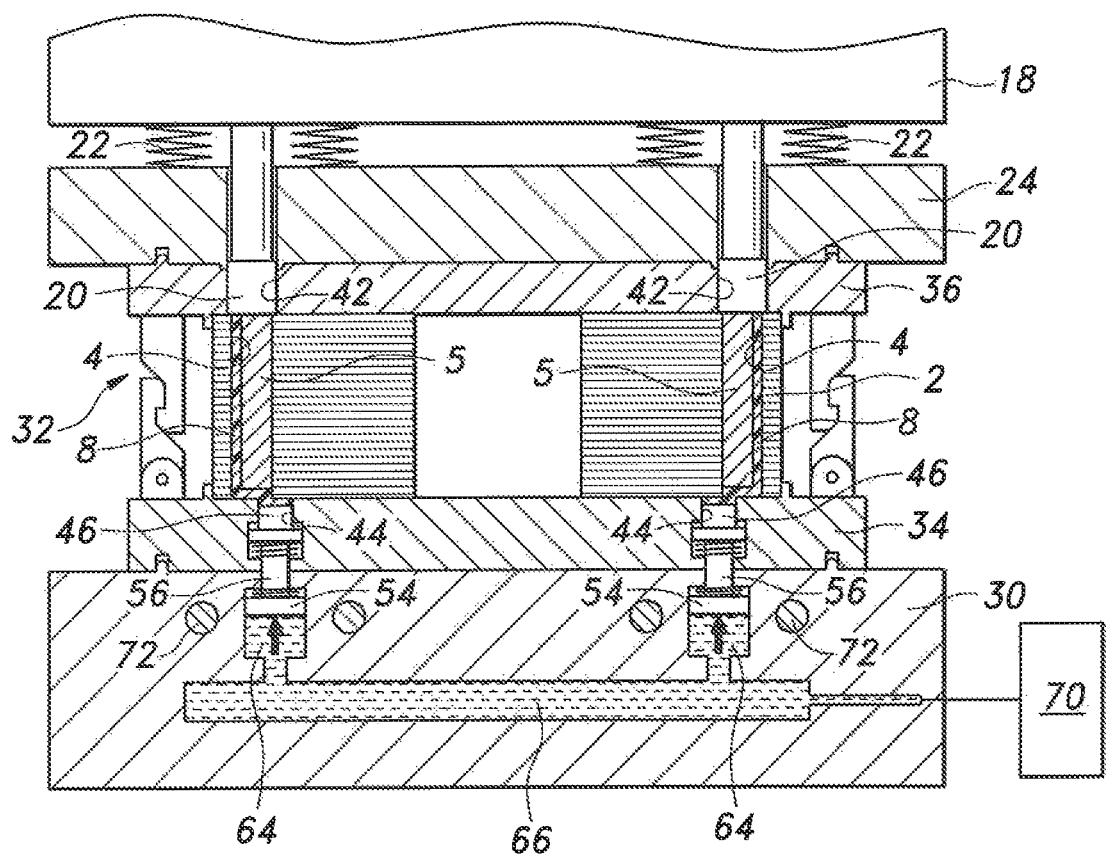
FIG. 11 is a fragmentary vertical sectional view showing a resin pressurizing step in the manufacturing method for a magnet embedded rotor according to the first embodiment of the present invention.

Thereafter, as shown in FIG. 11, in a resin pressurizing step, hydraulic pressure is supplied from the hydraulic device 70 to the respective cylinder chambers 64 so that the second pistons 54 push the corresponding first pistons 46 upward via the respective piston rods 56. As a result, the molten resin 8 that has flowed into each buffer chamber 44 is pressurized so that at least a part of the molten resin 8 that has flowed into the buffer chamber 44 is pushed back to the corresponding magnet insertion hole 4, and the molten resin 8 in the magnet insertion hole 4 is pressurized.

The air in each magnet insertion hole 4 is vented via the corresponding air vent passages 21 and 37 so that the molten resin 8 is allowed to infiltrate into the gap between the magnets 5 in the magnet insertion holes 4 and the rotor core 2 in a favorable manner, and the chemical reaction (curing) owing to the heating of the molten resin 8 is allowed to progress in a favorable manner. In this case, the molten resin 8 is cured under a suitable pressure so that the mechanical attachment strength of the magnets 5 owing to the cured resin 6 can be improved and ensured in a stable manner.

Figure 12:
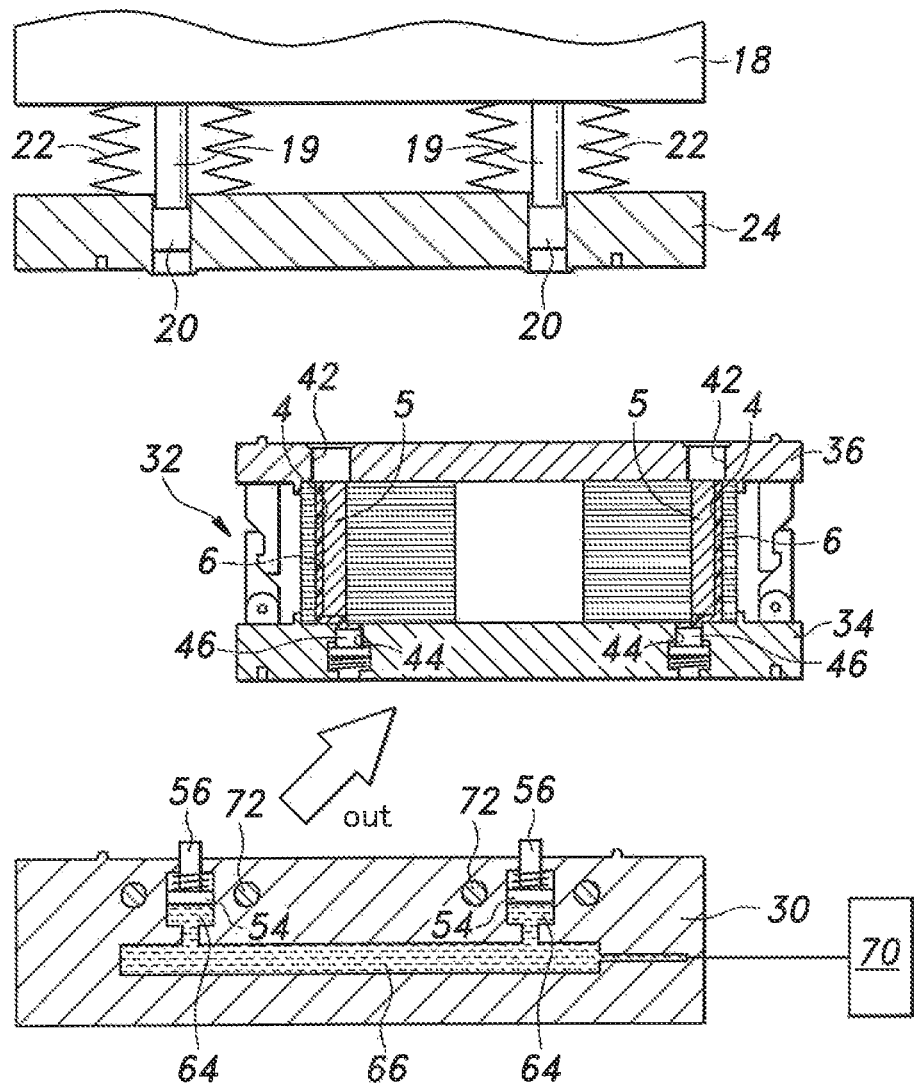
FIG. 12 is a fragmentary vertical sectional view showing a removal step in the manufacturing method for a magnet embedded rotor according to the first embodiment of the present invention.

Upon elapsing of a prescribed pressurization time period, the supply of hydraulic pressure to the cylinder chambers 64 is terminated, and the moveable platen 14 (see FIG. 3) is raised until the upper die 18 is returned to the original upper position as shown in FIG. 12. In a retainer removal step that follows, the rotor core retainer 32 is removed from the lower die 30.

In a following thermal curing step that further advances the chemical reaction by the heating of the molten resin 8, the rotor core 2 along with the rotor core retainer 32 is heated in a heating oven not shown in the drawings, and the curing of the molten resin 8 in the magnet insertion holes 4 and the buffer chambers 44 is further advanced by the heating of the molten resin 8. Thereby, the heating time in the manufacturing device 10 (in particular the press structure thereof) can be reduced. Therefore, by preparing a plurality of rotor core retainers 32 for each manufacturing device 10, the operation efficiency of the manufacturing device 10 can be improved.

The thermal curing step can also be performed by using an electric heater 72 while the rotor core retainer 32 is placed on the lower die 30 as shown in FIG. 11 so that the curing process can be completed by using a simple structure.

Figure 13:
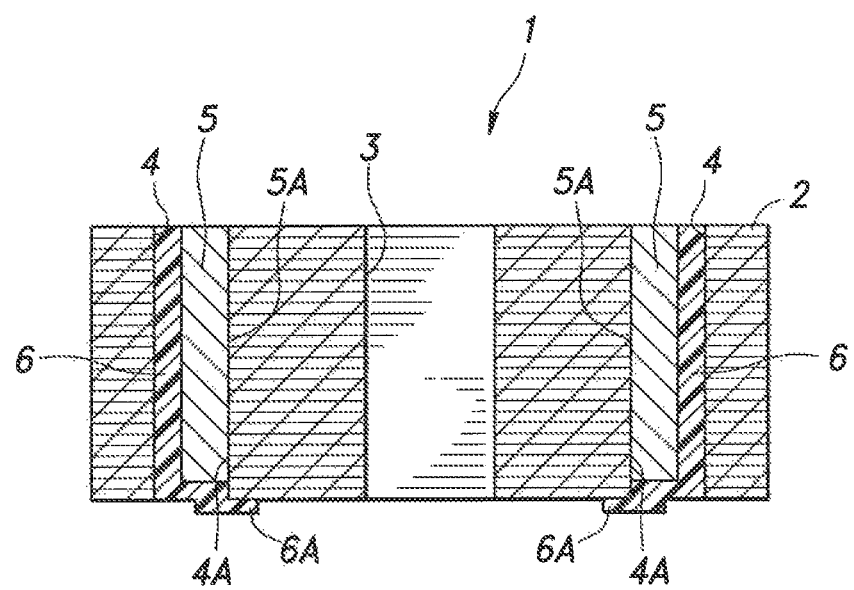
FIG. 13 is a vertical sectional view of the magnet embedded rotor removed in the removal step in the manufacturing method for a magnet embedded rotor according to the first embodiment of the present invention.

Upon completion of the curing of the molten resin 8, the engagement between the lower clamping plate 34 and the upper clamping plate 36 effected by the engagement between the moveable engagement claws 38 and the fixed engagement claws 40 is released, and the rotor core 2 is removed from the rotor core retainer 32 as a core removal step. The rotor core 2 that has been removed from the rotor core retainer 32 is removed from the lower clamping plate 34 with the resin 6A that has cured in the buffer chambers 44 still connected to the cured resin 6 in the magnet insertion holes 4 via overlapping portions as shown in FIG. 13.

Therefore, the resin 6A that has cured in the buffer chambers 44 is prevented from remaining in the rotor core retainer 32, and the cleaning of the rotor core retainer 32 that is to be used repeatedly can be simplified. In other words, the need for removing the resin 6A from the buffer chambers 44 can be eliminated. The resin 6A which is connected to the resin 6 in the magnet insertion holes 4 may be removed during a finishing step for the magnet embedded core 1 that includes removal of burrs. If the cured resin 6A does not create any problem, the cured resin 6A may not be removed.

As described above, in the present embodiment, the resin 7 in solid state is charged into the magnet insertion holes 4, and the upper openings of the magnet insertion holes 4 are closed while the magnets 5 are being inserted into the magnet insertion holes 4 so that the resin 8 that has melted in the magnet insertion holes 4 is allowed to flow into the buffer chambers 44. Therefore, the molten resin 8 is effectively prevented from overflowing from the upper openings of the magnet insertion holes 4. Also, the molten resin 8 which is enclosed in the magnet insertion holes 4 can be pressurized so that the molten resin 8 can be molded while being subjected to both pressure and heat. Passages such as runners for conducting the resin which has been melted outside of the manufacturing device 10 are not required so that excess resin is prevented from being produced. The volume of the resin 6A that has cured in the buffer chambers 44 is insignificant as compared to the excess resin that would remain in runners or the like.

Figure 14A:
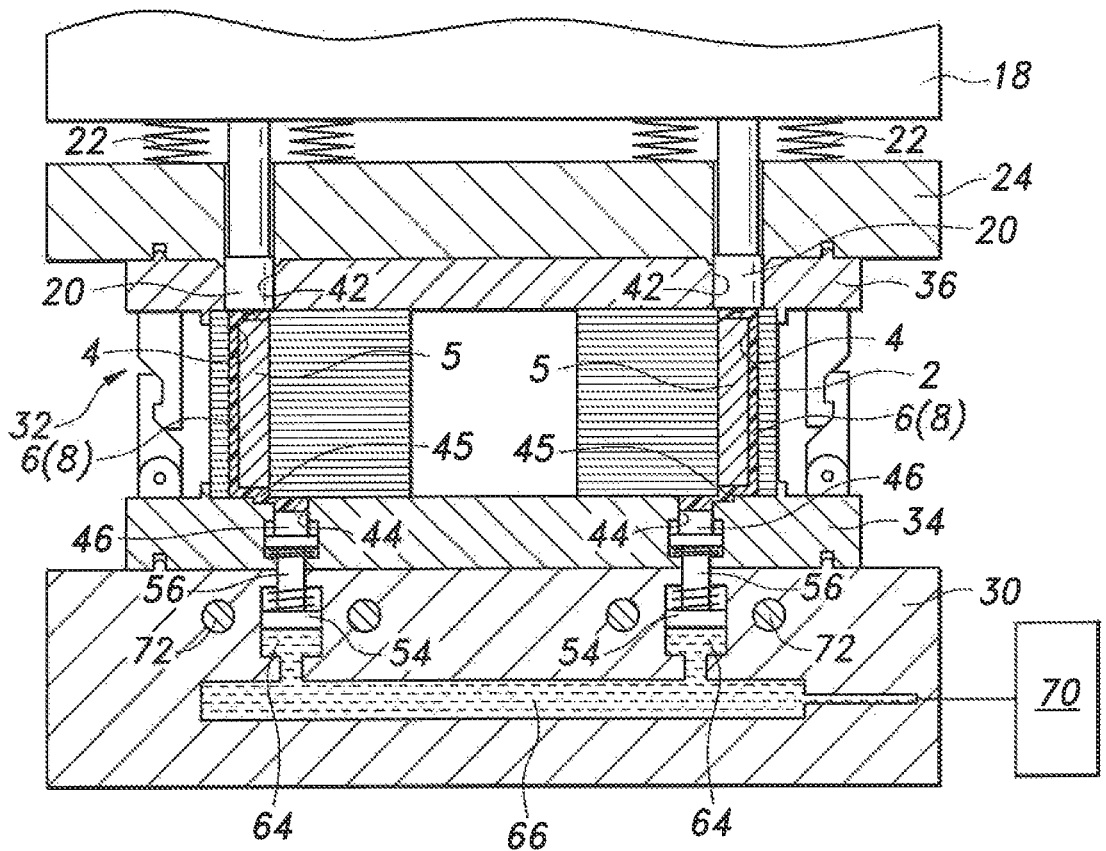
FIG. 14 is a fragmentary vertical section view of a manufacturing device for a magnet embedded rotor according to a second embodiment of the present invention in a removal step.
Figure 14B:
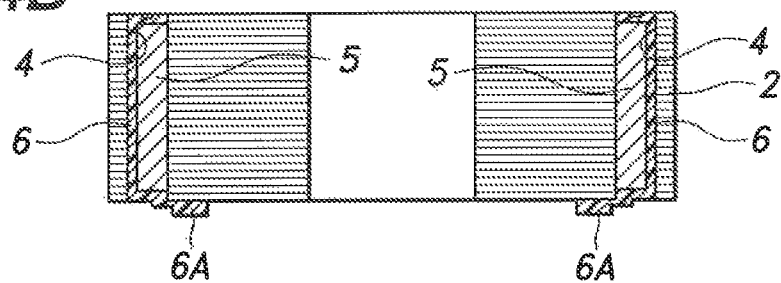
Figure 14C:
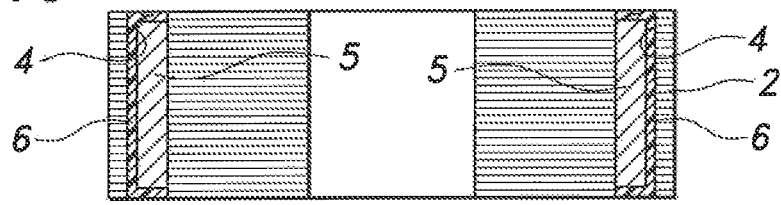

A manufacturing device 10 for a magnet embedded core 1 according to a second embodiment of the present invention is described in the following with reference to FIG. 14. In FIG. 14, parts corresponding to those shown in FIGS. 3 to 13 are denoted with like numerals, and such parts may not be described in the following disclosure.

In the second embodiment, as shown in (A) of FIG. 14, the upper opening of each buffer chamber 44 at the supporting surface 35 (see FIG. 10) does not overlap with the lower opening of the corresponding magnet insertion hole 4, and is spaced apart therefrom in the radial direction of the rotor core 2. These two openings are communicated with each other via a communication groove 45 formed in the supporting surface 35.

A part of the molten resin 8 in the magnet insertion holes 4 is forwarded to the buffer chambers 44 via the communication grooves 45 in the closure step, and a part of the molten resin 8 in the buffer chambers 44 is forwarded to the magnet insertion holes 4 in the resin pressurizing step.

In the curing step, the molten resin 8 in the communication grooves 45 as well as the molten resin 8 in the magnet insertion holes 4 and the buffer chambers 44 cures. In the core removal step following the curing of the molten resin, as shown in (B) of FIG. 14, the rotor core 2 is removed from the lower clamping plate 34 with the resin 6A that has cured in the buffer chambers 44 being connected to the resin that has cured in the magnet insertion holes 4 by the resin that has cured in the communication grooves 45.

Therefore, also in the second embodiment, the resin 6A that has cured in the buffer chambers 44 is prevented from being left in the rotor core retainer 32, and the cleaning of the rotor core retainer 32 that is to be used repeatedly is facilitated. In this case also, the work step to remove the resin 6A from the buffer chambers 44 is not required. The resin 6A in the buffer chambers 44 that is connected to the resin 6 in the magnet insertion holes 4 by the resin in the communication grooves 45 may be removed in the finishing step for the magnet embedded core 1 that includes removal of burrs as shown in (C) of FIG. 14.

Figure 15A:
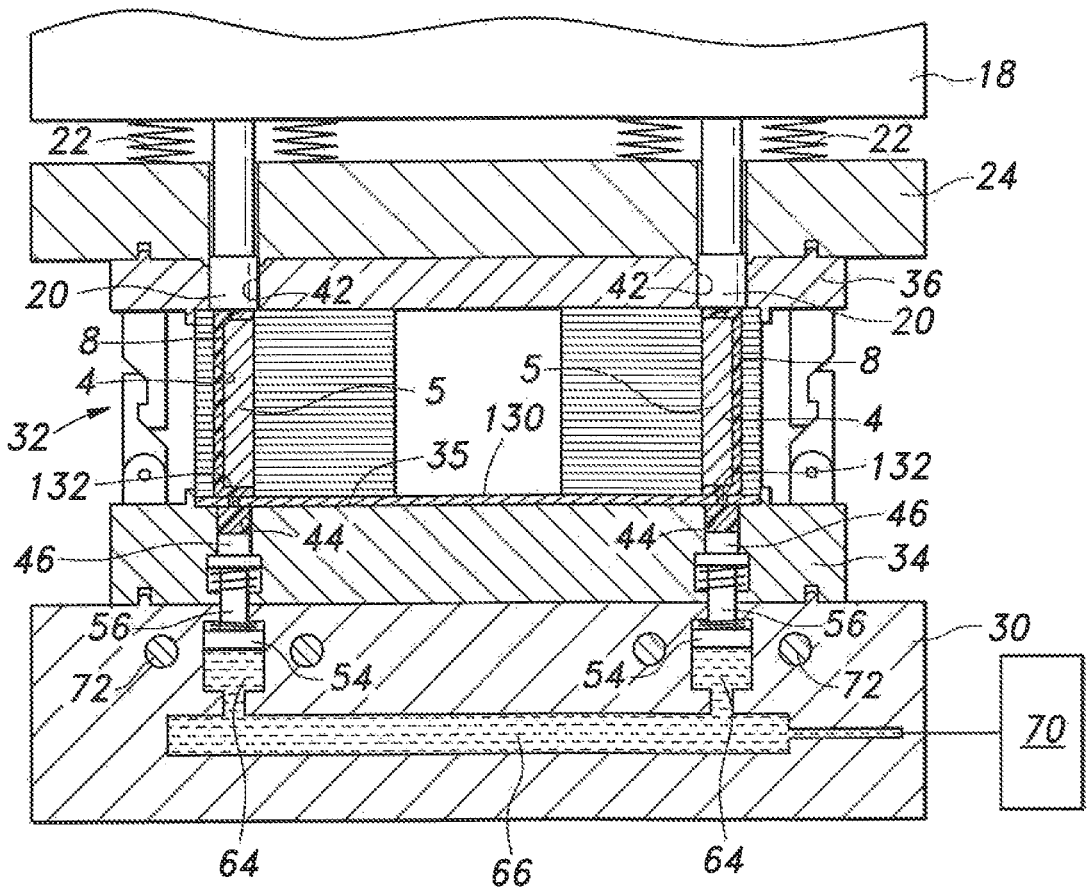
FIG. 15 is a fragmentary vertical section view of a manufacturing device for a magnet embedded rotor according to a third embodiment of the present invention in a removal step.
Figure 15B:
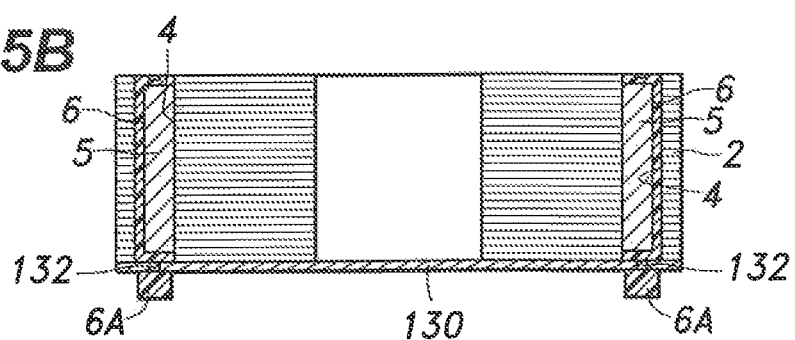
Figure 15C:
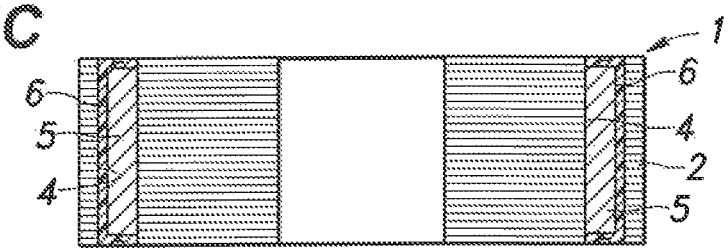

A manufacturing device 10 for a magnet embedded core 1 according to a third embodiment of the present invention is described in the following with reference to FIG. 15. In FIG. 15, parts corresponding to those shown in FIGS. 3 to 13 are denoted with like numerals, and such parts may not be described in the following disclosure.

In the third embodiment, as shown in (A) of FIG. 15, the buffer chambers 44 are configured so as to entirely overlap with the magnet insertion holes 4. A planar plate 130 is interposed between the lower clamping plate 34 and the rotor core 2 placed on the lower clamping plate 34. The plate 130 is formed with a plurality of a small through holes 132 that individually communicate the upper openings of the buffer chambers 44 at the supporting surface 35 with the lower openings of the corresponding magnet insertion holes 4.

A part of the molten resin 8 in the magnet insertion holes 4 is forwarded to the buffer chambers 44 via the through holes 132 in the closure step, and a part of the molten resin 8 in the buffer chambers 44 is forwarded to the magnet insertion holes 4 via the through holes 132 in the resin pressurizing step.

In the curing step, the molten resin 8 in the through holes 132 as well as the molten resin 8 in the magnet insertion holes 4 and the buffer chambers 44 cures. In the core removal step following the curing of the molten resin, as shown in (B) of FIG. 15, the rotor core 2 along with the plate 130 is removed from the rotor core retainer 32. Thus, the rotor core 2 can be removed from the lower clamping plate 34 with the resin 6A that has cured in the buffer chambers 44 being connected to the resin that has cured in the magnet insertion holes 4 by the resin that has cured in the through holes 132.

Therefore, also in the third embodiment, the resin 6A that has cured in the buffer chambers 44 is prevented from being left in the rotor core retainer 32, and the cleaning: of the rotor core retainer 32 that is to be used repeatedly is facilitated. In this case also, the work step to remove the resin 6A from the buffer chambers 44 is not required. The resin 6A in the buffer chambers 44 that is connected to the resin 6 in the magnet insertion holes 4 by the resin in the through holes 132 may be removed in the finishing step for the magnet embedded core 1 that includes removal of burrs as shown in (C) of FIG. 15. Since the through holes 132 have a small diameter, the removal of the plate 130 that accompanies the breaking of the resin cured in the through holes 132 can be accomplished with a small force.

Figure 16A:
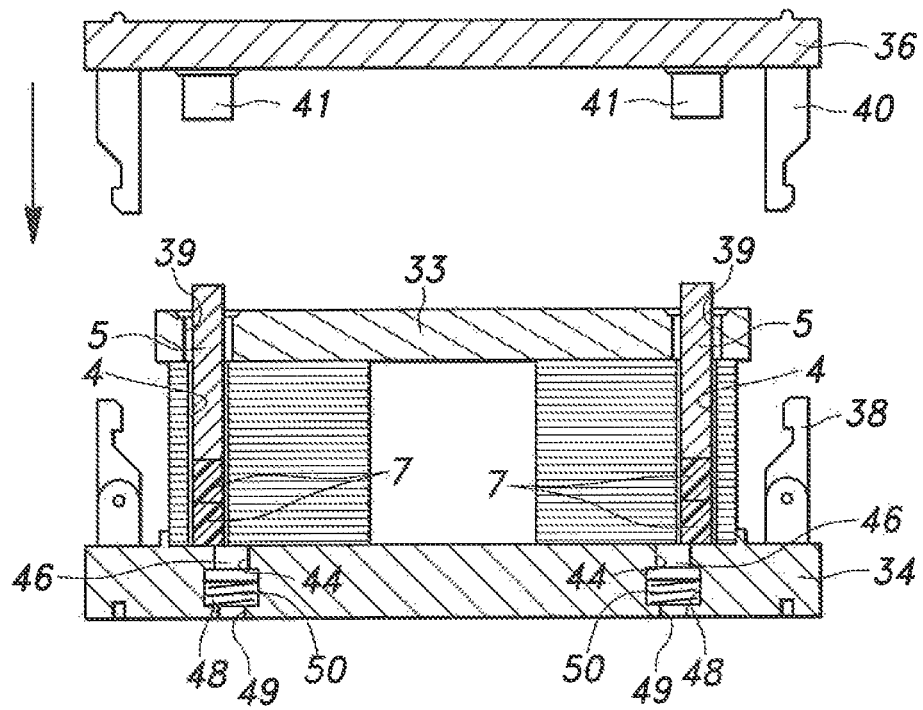
FIG. 16 is a sectional view of a rotor core retainer (manufacturing jig) according to an embodiment of the present invention.
Figure 16B:
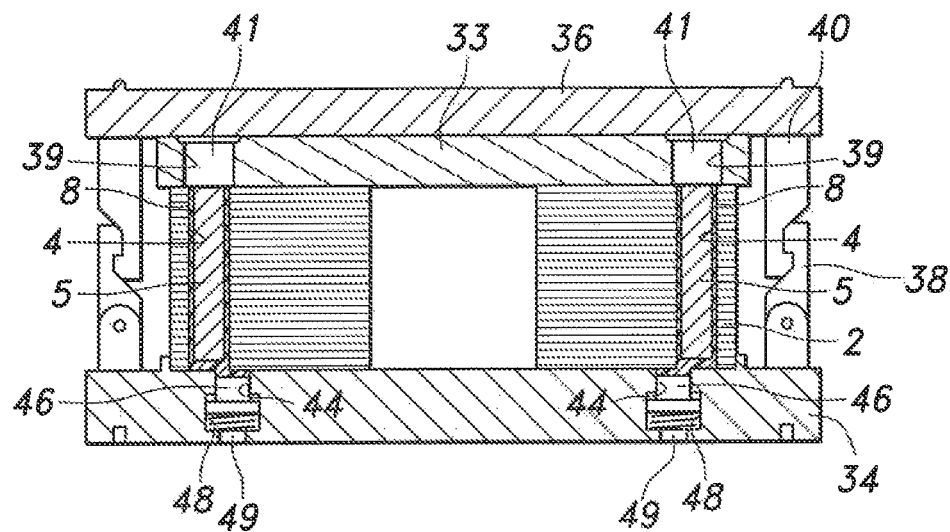

Another embodiment of the rotor core retainer 32 is described in the following with reference to FIG. 16. In FIG. 16, parts corresponding to those shown in FIGS. 3 to 13 are denoted with like numerals, and such parts may not be described in the following disclosure.

In this embodiment, as shown in (A) of FIG. 16, an intermediate plate 33 is placed on the rotor core 2. The intermediate plate 33 is formed with a plurality of insertion holes 39 so as to individually correspond to the magnet insertion holes 4, and the solid resin 7 and the magnet 5 are charged into each magnet insertion hole 4 via the corresponding insertion hole 39.

The upper clamping plate 36 is provided with a plurality of closure portions 41 that can individually advance into the corresponding insertion holes 39 and close the upper openings of the corresponding magnet insertion holes 4.

As shown in (B) of FIG. 16, once the lower clamping plate 34 and the upper clamping plate 36 are coupled to each other owing to the engagement between the moveable engagement claws 38 and the fixed engagement claws 40, the closure portions 41 advance into the corresponding insertion holes 39, and abut upon the upper surface of the rotor core 2 with the result that the upper openings of the magnet insertion holes 4 are closed. Insertion of the magnets 5 allow the magnet insertion holes 4 to be filled with the resin.

As a result, while the rotor core 2 is retained by the rotor core retainer 32, the resin charging step, the magnet insertion step and the melting step can be performed. The resin pressurizing step can also be performed by advancing push rods (not shown in the drawings) into the piston chambers 48 via the communication holes 49, and pushing the first pistons 46 with the corresponding push rods. In this case, the manufacturing device 10 is not required.

Figure 17:
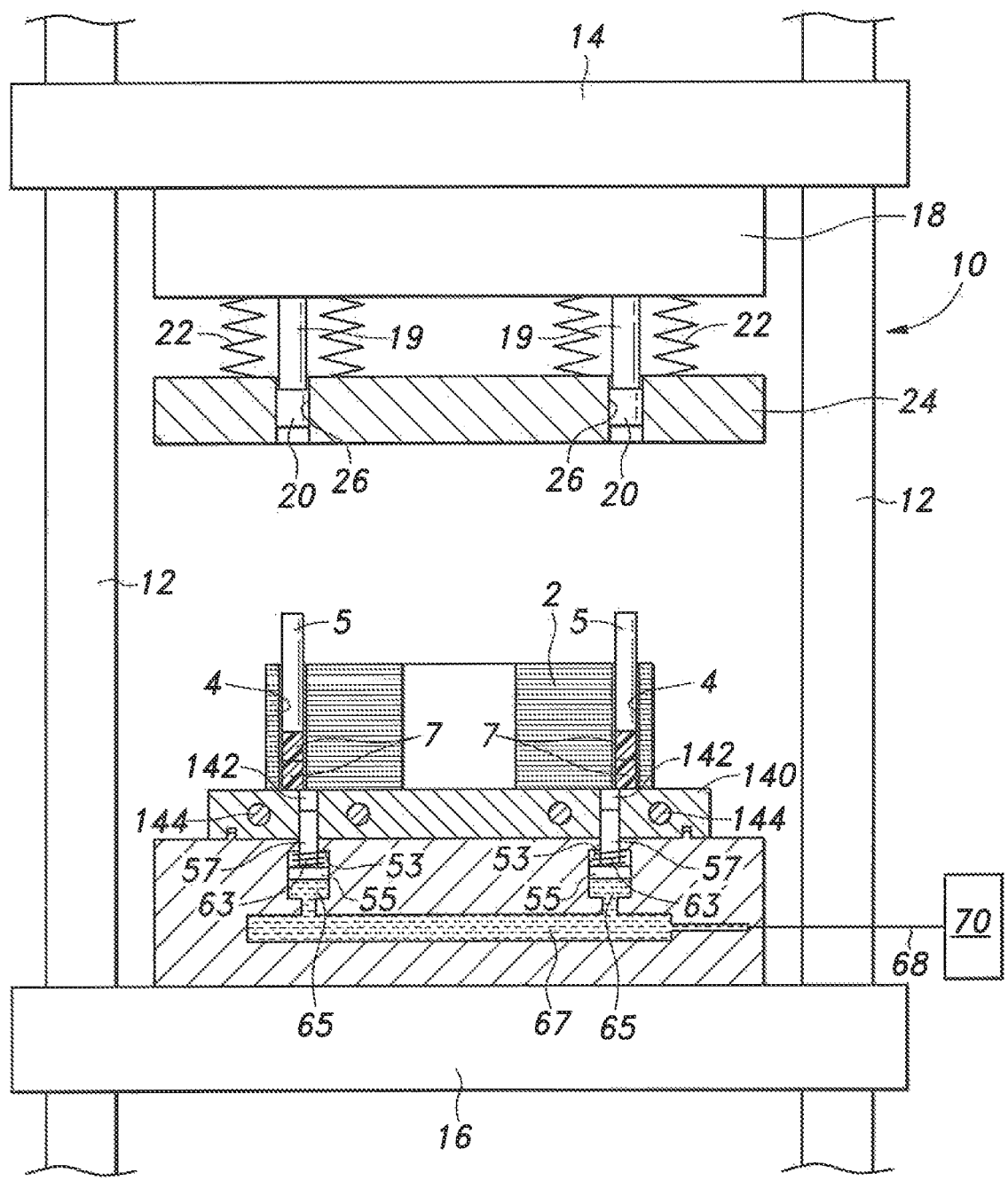
FIG. 17 is a vertical section view of a manufacturing device for a magnet embedded core according to a fourth embodiment of the present invention in a resin charging and a magnet insertion step.
Figure 18:
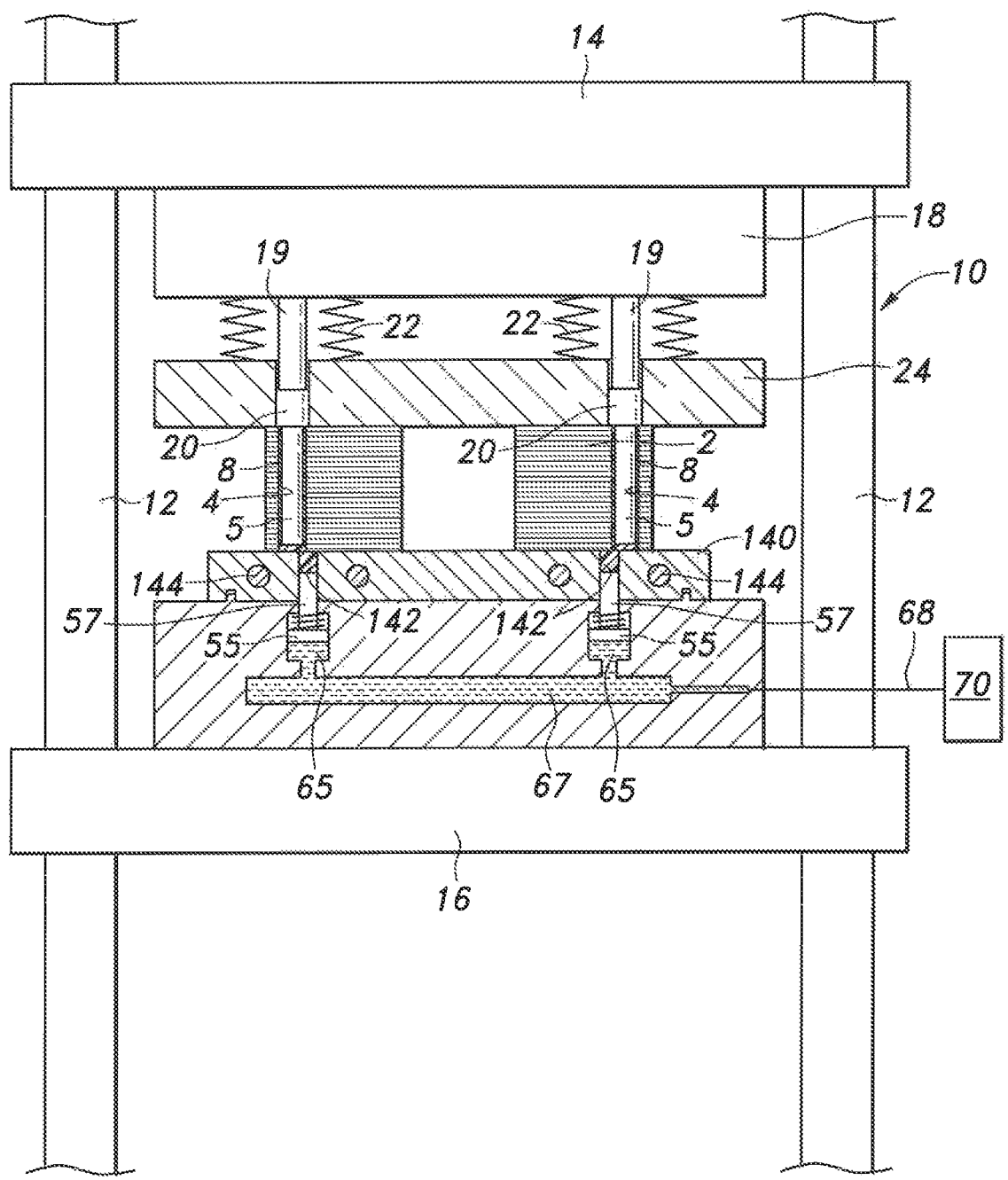
FIG. 18 is a vertical section view of the manufacturing device for a magnet embedded core according to the fourth embodiment of the present invention in a closure step.

A manufacturing device 10 for a magnet embedded core 1 according to a fourth embodiment of the present invention is described in the following with reference to FIGS. 17 and 18. In FIGS. 17 and 18, parts corresponding to those shown in FIGS. 3 to 13 are denoted with like numerals, and such parts may not be described in the following disclosure.

In the fourth embodiment, the rotor core retainer 32 is omitted, and a supporting plate 140 is provided on the lower die 30 so as to serve as a mounting table. The rotor core 2 is placed on the supporting plate 140. The supporting plate 140 is formed with buffer chambers 142 similar to the buffer chambers 44 of the first embodiment so as to individually correspond to the magnet insertion holes 4. An electric heater 144 is incorporated in the supporting plate 140. The supporting plate 140 may be replaced after a prescribed number of cycles of the aforementioned steps have been performed so that the rotor core 2 can be manufactured by using a highly simple arrangement.

The lower die 30 is formed with cylinder bores 53 so as to correspond to the respective buffer chambers 142. Each cylinder bore 53 receives a third piston 55 in a vertically (axially) slidable manner. Each third piston 55 is provided with a piston rod 57 that advances into the corresponding buffer chamber 142 in a vertically slidable manner so as to directly pressurize the molten resin 8 in the buffer chamber 142.

The lower die 30 defines a plurality of cylinder chambers 65 serving as pressurization chambers under the third pistons 55, respectively. The cylinder chambers 65 are provided so as to correspond to the respective third pistons 55 and hence to the respective buffer chambers 142, and are connected to a hydraulic device 70 via a manifold passage 67 and external piping 68 so as to receive a supply of hydraulic oil from the hydraulic device 70.

As shown in FIG. 18, as the moveable platen 14 descends, the closure members 20 abut upon the rotor core 2, and close the upper openings of the corresponding magnet insertion holes 4.

The solid resin 7 in the magnet insertion holes 4 is melted during the melting step, and a part of the molten resin 8 flows into the buffer chambers 142 at the same time. When hydraulic pressure is supplied from the hydraulic device 70 to the cylinder chambers 65 in the resin pressurizing step, the third pistons 55 are pressed upward so that the molten resin 8 in the buffer chambers 142 is pressurized by the piston rods 57.

Thus, the fourth embodiment provides similar functions and advantages as the first embodiment. In the fourth embodiment also, in the arrangement where the third pistons 55 serving as the pressurizing members for pressurizing the molten resin 8 and the cylinder chambers 65 are provided individually for the respective buffer chambers, the pressurized oil is supplied to the cylinder chambers 65 via the common manifold passage 67 so that the pressure may be distributed evenly among the cylinder chambers 65.

In this embodiment, the clamping of the rotor core 2 is performed by using the core pressing member 24 having the closure members 20 in a vertically moveable manner and mounted on the side of the moveable platen 14. However, it is also possible to use a plate-shaped core pressing member 24 to directly close the magnet insertion holes 4 of the rotor core. In other words, the plate-shaped core pressing member 24 may be utilized in place of the closure members 20. This also provides the functions and the advantages of the manufacturing methods discussed above by using a simple structure.

Although the present invention has been described in terms of preferred embodiments thereof as can be appreciated easily by a person skilled in the art, the present invention is not limited by these embodiments, but can be modified in appropriate ways without departing from the spirit of the present invention.

For instance, the melting step may be performed such that the resin is melted by being heated immediately after the resin is charged. However, the melting step may be performed concurrently as the magnet inserting step, before the magnet inserting step or after the magnet inserting step.

In the foregoing embodiments, the resin 6 consisted of thermosetting resin, but may also consist of thermoplastic resin. When thermoplastic resin is used, the curing step is performed as a cooling step, instead of the thermal curing step used for the thermosetting resin. The solid resin may be in the forms of pellet, powder or granule.

In the foregoing embodiments, the magnet 5 in each magnet insertion hole 4 was offset in the inward direction. However, the position of the magnet 5 in each magnet insertion hole 4 can be freely changed. For instance, each magnet 5 may be placed centrally in the corresponding magnet insertion hole 4. The electric heater may also be provided in the core pressing member 24. The press structure may be vertically inverted such that the moveable side is located on the lower side. In such a case, the fixed platen 16 is placed on the upper side while the moveable platen 14 is provided on the lower side, and the lower die 30 is placed on the moveable platen 14.

The pressurization of the molten resin 8 in the buffer chambers 44 and 142 may be performed not only by using hydraulic pressure but also by using forces produced by an electric, a piezoelectric or a mechanical device.

As shown in FIG. 10, the lower clamping plate 34 may be provided with air vent passages 43 for communicating the openings of the magnet insertion holes 4 facing the lower clamping plate 34 with the atmosphere.

The constituent elements of the foregoing embodiments are not entirely essential for the present invention, but may be suitably omitted or substituted without departing from the spirit of the present invention.

Glossary of Terms 1 magnet embedded core
2 rotor core
3 shaft hole
4 magnet insertion hole
4A inner surface
5 magnet
5A outer surface
6 cured resin
6A resin
7 solid resin
8 molten resin
10 manufacturing device
12 tie bar
14 moveable platen
16 fixed platen
18 upper mold
19 rod
20 closure member 20A projection
21 air vent passage
22 spring
24 core pressing member
24A recess
24B projection
26 through hole
30 lower die (base)
30A projection
32 rotor core retainer (manufacturing jig)
33 intermediate platen
34 lower clamping plate (mounting table)
34A projection
34B recess
34C projection
35 supporting surface
36 upper clamping plate
36A projection
36B projection
36C recess
37 air vent passage
38 moveable engagement claw
39 insertion hole
40 fixed engagement claw
41 closure portion
42 insertion hole
43 air vent passage
44 buffer chamber
45 communication groove
56 first piston
46A lower flange
48 piston chamber
49 communication hole
50 compression coil spring
52 cylinder bore
53 cylinder bore
54 second piston
55 third piston
56 piston rod
57 piston rod
58 through hole
60 through hole
62 compression coil spring
63 compression coil spring
64 cylinder chamber (pressurizing chamber)
65 cylinder chamber (pressurizing chamber)
66 manifold passage
67 manifold passage
68 external piping
70 hydraulic device
72 electric heater
80 resin charging device
82 resin receiving hole
84 main body
84A recess
86 shutter plate
88 shutter holding plate
90 resin guide member
100 magnet inserting device
102 magnet retaining hole
104 main body
104A recess
106 shutter plate
108 shutter holding plate
110 magnet guide member
112 electric heater
114 guide rod
116 moveable plate
118 pressure rod
120 electric motor
122 feed screw rod
124 feed nut
130 plate
132 through hole
140 supporting plate (mounting table)
142 buffer chamber
144 electric heater

The invention claimed is:

1. A manufacturing method for manufacturing a magnet embedded core including a rotor core formed with a magnet insertion hole passed axially through the rotor core, the magnet insertion hole having openings at both ends, and a magnet embedded in resin filling the magnet insertion hole, comprising:
a placing step of placing the rotor core on a mounting table such that an end surface of the rotor core is in contact with the mounting table;
a resin charging step of charging the resin in solid state into the magnet insertion hole through an opening of the magnet insertion hole on a side opposite from the mounting table;
a melting step of melting the charged resin in the magnet insertion hole such that molten resin flows into a buffer chamber formed in the mounting table from an opening of the magnet insertion hole on a side of the mounting table, wherein the buffer chamber opens out at a supporting surface for the rotor core to have an opening area smaller than an opening area of the magnet insertion hole so that the buffer chamber communicates with the magnet insertion hole;
a magnet inserting step of inserting the magnet into the magnet insertion hole;
a closure step of closing the opening of the magnet insertion hole on a side opposite from the mounting table; and
a resin pressurizing step of pressurizing the molten resin in the buffer chamber following the closure step, wherein the resin pressurizing step includes venting air in the magnet insertion hole to outside via an air vent passage communicating with at least one of the openings of the magnet insertion hole on a side of the mounting table and the opening of the magnet insertion hole on a side opposite from the mounting table.

2. The manufacturing method for manufacturing a magnet embedded core as defined in claim 1, wherein the resin pressurizing step includes pushing back at least a part of the resin in the buffer chamber into the magnet insertion hole via a pressurization of the resin.

3. The manufacturing method for manufacturing a magnet embedded core as defined in claim 1, wherein the resin pressurizing step is performed by a first piston moveably provided in the buffer chamber.

4. The manufacturing method for manufacturing a magnet embedded core as defined in claim 1, wherein the magnet insertion hole comprises a plurality of magnet insertion holes, and the buffer chamber comprises a plurality of buffer chambers provided so as to correspond to the respective magnet insertion holes, and
wherein the molten resin in each buffer chamber is pressurized by a hydraulic drive device provided in each buffer chamber, and hydraulic pressure is supplied to the respective hydraulic drive devices via a common manifold passage.

5. The manufacturing method for manufacturing a magnet embedded core as defined in claim 1, wherein an opening of the buffer chamber at a supporting surface at least partly overlaps with the opening of the magnet insertion hole on a side of the mounting table, the method further comprising a removal step of removing the rotor core from the mounting table while the resin in the buffer chamber is connected to the resin in the magnet insertion hole at an overlapping portion.

6. The manufacturing method for manufacturing a magnet embedded core as defined in claim 1, wherein an opening of the buffer chamber at a supporting surface does not overlap with the opening of the magnet insertion hole on a side of the mounting table, and the two openings communicate with each other via a communication groove formed in the supporting surface when the rotor core is placed on the mounting table, the method further comprising a removal step of removing the rotor core from the mounting table while the resin in the buffer chamber is connected to the resin in the magnet insertion hole by the resin in the communication groove.

7. The manufacturing method for manufacturing a magnet embedded core as defined in claim 1, wherein a plate is interposed between the mounting table and the rotor core, and an opening of the buffer chamber at a supporting surface communicates with the opening of the magnet insertion hole on a side of the mounting table via a through hole formed in the plate, the method further comprising a removal step of removing the rotor core from the mounting table together with the plate while the resin in the buffer chamber is connected to the resin in the magnet insertion hole by the resin in the through hole.

8. A manufacturing device for manufacturing a magnet embedded core including a rotor core formed with a magnet insertion hole passed axially through the rotor core, the magnet insertion hole having openings at both ends, and a magnet embedded in resin filling the magnet insertion hole, comprising:

a mounting table configured to support the rotor core thereon, and including a buffer chamber communicating with the magnet insertion hole of the rotor core supported by the mounting table, wherein the buffer chamber opens out at a supporting surface for the rotor core to have an opening area smaller than an opening area of the magnet insertion hole and communicates with the magnet insertion hole;

a heating device configured to melt the resin in solid state in the magnet insertion hole by heating the rotor core placed on the mounting table such that molten resin flows into the buffer chamber from an opening of the magnet insertion hole on a side of the mounting table;

a closure member configured to close an opening of the magnet insertion hole on a side opposite from the mounting table; and a resin pressurizing device configured to pressurize the molten resin in the buffer chamber.

9. The manufacturing device for manufacturing a magnet embedded core as defined in claim 8, wherein the resin pressurizing device comprises a hydraulic drive device having a first piston moveably provided in the buffer chamber to pressurize the molten resin in the buffer chamber.

10. The manufacturing device for manufacturing a magnet embedded core as defined in claim 9, further comprising a base supporting the mounting table, the resin pressurizing device comprising the hydraulic drive device having a second piston provided in the base to pressurize the first piston, and the hydraulic drive device configured to drive the second piston.

11. The manufacturing device for manufacturing a magnet embedded core as defined in claim 10, wherein the magnet insertion hole comprises a plurality of magnet insertion holes, and the buffer chamber comprises a plurality of buffer chambers provided so as to correspond to the respective magnet insertion holes, and the second piston and a cylinder chamber for the second piston are provided for each of the buffer chambers, and hydraulic pressure is supplied to the respective cylinder chambers via a common manifold passage.

12. The manufacturing device for manufacturing a magnet embedded core as defined in claim 8, further comprising a base supporting the mounting table, the resin pressurizing device comprising a hydraulic drive device having a third piston provided in the base to pressurize the molten resin in the buffer chamber, and the hydraulic drive device configured to drive the third piston.

13. The manufacturing device for manufacturing a magnet embedded core as defined in claim 12, wherein the magnet insertion hole comprises a plurality of magnet insertion holes, and the buffer chamber comprises a plurality of buffer chambers provided so as to correspond to the respective magnet insertion holes, and the third piston and a cylinder chamber for the third piston are provided for each of the buffer chambers, and hydraulic pressure is supplied to the respective cylinder chambers via a common manifold passage.

14. The manufacturing device for manufacturing a magnet embedded core as defined in claim 8, wherein an opening of the buffer chamber at a supporting surface at least partly overlaps with the opening of the magnet insertion hole on a side of the mounting table.

15. The manufacturing device for manufacturing a magnet embedded core as defined in claim 8, wherein an opening of the buffer chamber at a supporting surface does not overlap with the opening of the magnet insertion hole on a side of the mounting table, and the supporting surface is formed with a communication groove communicating the two openings with each other.

16. The manufacturing device for manufacturing a magnet embedded core as defined in claim 8, further comprising a plate interposed between the mounting table and the rotor core, and having a through hole communicating the buffer chamber with the magnet insertion hole.

17. The manufacturing device for manufacturing a magnet embedded core as defined in claim 8, wherein the closure member has an air vent passage communicating the opening of the magnet insertion hole on a side opposite from the mounting table with outside.

18. The manufacturing device for manufacturing a magnet embedded core as defined in claim 8, wherein the mounting table has an air vent passage communicating the opening of the magnet insertion hole on a side of the mounting table with outside.

* * * * *